United States Patent
Kambayashi et al.

(10) Patent No.: US 10,797,292 B2
(45) Date of Patent: Oct. 6, 2020

(54) ENERGY STORAGE DEVICE, METHOD OF MANUFACTURING ENERGY STORAGE DEVICE, CURRENT COLLECTOR, AND COVER MEMBER

(71) Applicant: GS Yuasa International Ltd., Kyoto-shi (JP)

(72) Inventors: Hirokazu Kambayashi, Kyoto (JP); Kazuto Maeda, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 116 days.

(21) Appl. No.: 15/763,427

(22) PCT Filed: Sep. 27, 2016

(86) PCT No.: PCT/JP2016/078383
§ 371 (c)(1),
(2) Date: Mar. 26, 2018

(87) PCT Pub. No.: WO2017/057323
PCT Pub. Date: Apr. 6, 2017

(65) Prior Publication Data
US 2018/0287124 A1  Oct. 4, 2018

(30) Foreign Application Priority Data
Sep. 28, 2015  (JP) .................. 2015-190470

(51) Int. Cl.
*H01M 2/26* (2006.01)
*H01M 2/04* (2006.01)
(Continued)

(52) U.S. Cl.
CPC ............ *H01M 2/26* (2013.01); *H01G 9/0029* (2013.01); *H01G 9/048* (2013.01); *H01G 9/08* (2013.01);
(Continued)

(58) Field of Classification Search
CPC ........... H01M 10/0585; H01M 2/0426; H01M 2/0469; H01M 2/0473; H01M 2/26; H01M 2/263
See application file for complete search history.

(56) References Cited

U.S. PATENT DOCUMENTS 8,105,712 B2 * 1/2012 Miyata ................ B23K 26/206
429/185
2006/0051664 A1 * 3/2006 Tasai ..................... H01M 2/266
429/161
(Continued)

FOREIGN PATENT DOCUMENTS

JP  2000-133241 A  5/2000
JP  2007-149353 A  6/2007
(Continued)

OTHER PUBLICATIONS

International Search Repor (ISR) (PCT Form PCT/ISA/210), in PCT/JP2016/078383, dated Dec. 27, 2016.

*Primary Examiner* — Carlos Barcena
(74) *Attorney, Agent, or Firm* — McGinn I.P. Law Group, PLLC.

(57) ABSTRACT

An energy storage device includes: an electrode assembly formed by stacking plates; and a first conductive member welded to one of both surfaces of a converged portion on an end portion of the electrode assembly without covering the converged portion from an end portion side, wherein a welding surface of a welded portion where the electrode assembly and the first conductive member are welded to each other is disposed at a position recessed from an outer surface of the first conductive member.

17 Claims, 16 Drawing Sheets

(51) Int. Cl.
    *H01M 10/0585*     (2010.01)
    *H01G 11/76*     (2013.01)
    *H01G 11/84*     (2013.01)
    *H01G 11/74*     (2013.01)
    *H01G 9/00*     (2006.01)
    *H01G 9/048*     (2006.01)
    *H01G 9/08*     (2006.01)

(52) U.S. Cl.
    CPC .............. *H01G 11/74* (2013.01); *H01G 11/76* (2013.01); *H01G 11/84* (2013.01); *H01M 2/0426* (2013.01); *H01M 2/0469* (2013.01); *H01M 2/0473* (2013.01); *H01M 2/263* (2013.01); *H01M 10/0585* (2013.01); *Y02E 60/13* (2013.01); *Y02T 10/7022* (2013.01)

(56) References Cited

U.S. PATENT DOCUMENTS

| | | | |
|---|---|---|---|
| 2007/0117009 A1 | 5/2007 | Yamauchi et al. | |
| 2009/0104525 A1 | 4/2009 | Nakagawa et al. | |
| 2010/0081051 A1* | 4/2010 | Taniguchi | H01M 2/22 429/185 |
| 2013/0052531 A1* | 2/2013 | Yoshitake | H01M 2/263 429/211 |
| 2013/0209849 A1 | 8/2013 | Hattori et al. | |

FOREIGN PATENT DOCUMENTS

| | | |
|---|---|---|
| JP | 2009-099488 A | 5/2009 |
| JP | 2014-000594 A | 1/2014 |
| WO | WO 2012/057335 A1 | 5/2012 |
| WO | WO 2013/191218 A1 | 12/2013 |

\* cited by examiner (a)

(b)

(a)

(b)

US 10,797,292 B2

ENERGY STORAGE DEVICE, METHOD OF MANUFACTURING ENERGY STORAGE DEVICE, CURRENT COLLECTOR, AND COVER MEMBER

TECHNICAL FIELD

The present invention relates to an energy storage device which includes an electrode assembly and conductive members or the like.

BACKGROUND ART

Conventionally, there has been known an energy storage device where a current collector is welded to a converged portion which forms an end portion of an electrode assembly formed by stacking plates (see Patent Document 1, for example).

PRIOR ART DOCUMENT

Patent Document

Patent Document 1: JP-A-2007-149353

SUMMARY OF THE INVENTION

Problems to be Solved by the Invention

In the above-mentioned conventional energy storage device, there is a concern that lowering of performance of the energy storage device is induced.

The present invention has been made to overcome the above-mentioned drawback, and it is an object of the present invention to provide an energy storage device which can suppress lowering of performance of the energy storage device or the like.

Means for Solving the Problems

To achieve the above-mentioned object, according to an aspect of the present invention, there is provided an energy storage device which includes an electrode assembly formed by stacking plates; and a first conductive member welded to one of both surfaces of a converged portion on an end portion of the electrode assembly without covering the converged portion from an end portion side, wherein a welding surface of a welded portion where the electrode assembly and the first conductive member are welded to each other is disposed at a position recessed from an outer surface of the first conductive member.

Advantages of the Invention

According to the present invention, the occurrence of sputter and the damage applied to an electrode assembly at the time of welding the electrode assembly and conductive member to each other can be suppressed.

MODE FOR CARRYING OUT THE INVENTION

Figure 1:
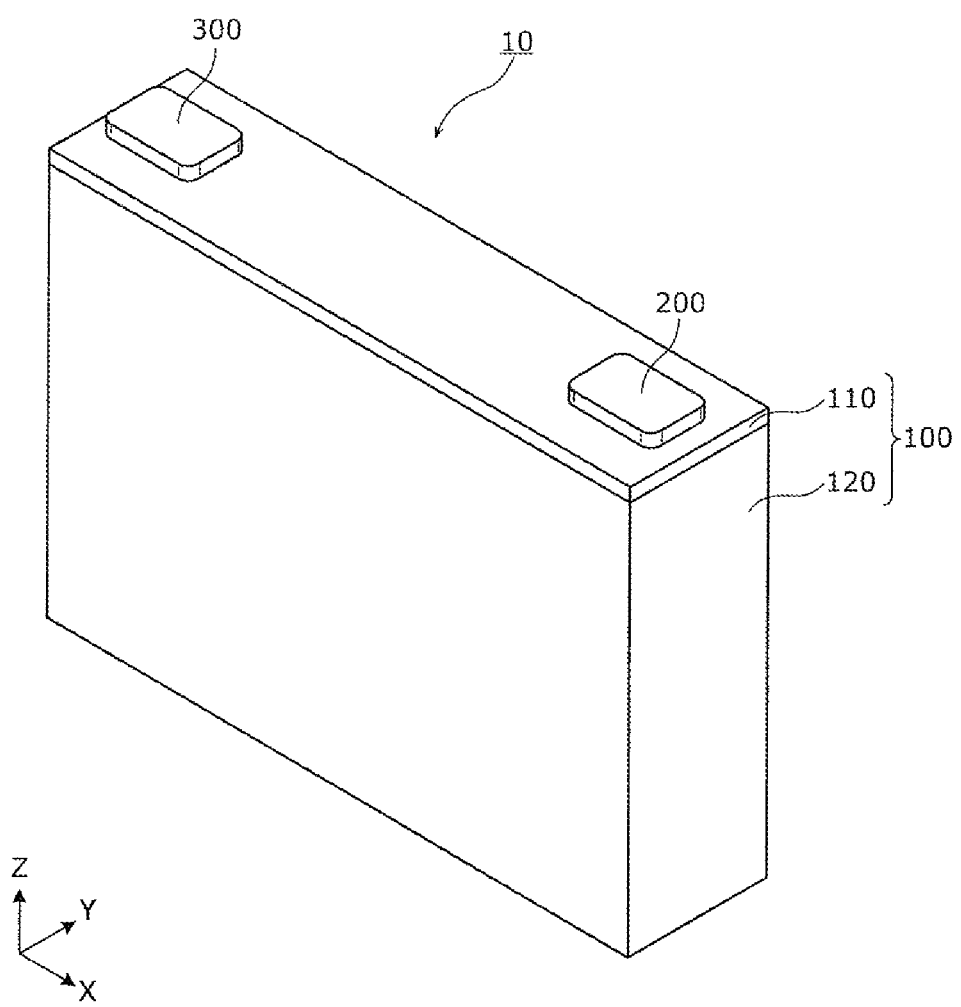
FIG. 1 is a perspective view schematically showing an external appearance of an energy storage device according to an embodiment of the present invention.

In the above-mentioned conventional energy storage device, a current collector covers both surfaces of a converged portion from an end portion side of an electrode assembly, and the current collector and the converged portion are welded to each other at a through hole formed in a portion disposed on one surface side of the converged portion. In this manner, the conventional energy storage device adopts the configuration where the current collector covers the converged portion from an end portion side and hence, when a width (a length from an end edge) of the converged portion is made short for increasing energy storage capacitance, the position which becomes a welding scheduled object approaches the end edge of the converged portion. Accordingly, there is a concern that lowering of performance of the energy storage device is induced such that the end edge of the converged portion is welded and sputter is liable to occur. Further, in general, large energy is necessary for welding the current collector and the electrode assembly. Accordingly, also in this case, there is a concern that lowering of performance of the energy storage device such as the occurrence of sputter or the like is induced.

The present invention has been made to overcome the above-mentioned drawbacks, and it is an object of the present invention to provide an energy storage device where lowering of performance of the energy storage device can be suppressed and the like.

To achieve the above-mentioned object, an energy storage device according to an aspect of the present invention includes: an electrode assembly formed by stacking plates; and a first conductive member welded to one of both surfaces of a converged portion on an end portion of the electrode assembly without covering the converged portion from an end portion side, wherein a welding surface of a welded portion where the electrode assembly and the first conductive member are welded to each other is disposed at a position recessed from an outer surface of the first conductive member.

With such a configuration, the first conductive member is welded to one of both surfaces of the converged portion without covering both surfaces of the converged portion from an end portion side of the electrode assembly. Accordingly, even when a width of the converged portion is made short for increasing energy storage capacitance, the position which becomes a welding scheduled object at the converged portion can be disposed away from an end edge of the converged portion. Accordingly, it is possible to suppress welding of a portion which includes the end edge of the converged portion. In this manner, welding of the end portion of the converged portion can be suppressed.

Further, a welding surface of a welded portion where the electrode assembly and the first conductive member are welded to each other is disposed at a position recessed from an outer surface of the first conductive member. That is, a distance between the electrode assembly and the welding surface can be shortened. Accordingly, welding can be performed with small energy.

In this manner, welding of the end portion of the converged portion can be suppressed and welding can be performed with small energy and hence, lowering of performance of the energy storage device can be suppressed by suppressing the occurrence of sputter at the time of welding or the like.

The first conductive member may be a current collector which the energy storage device includes or a cover member which the energy storage device includes and is disposed on a side opposite to the current collector with the electrode assembly sandwiched between the cover member and the current collector.

With such a configuration, the first conductive member is the current collector or the cover member and hence, the occurrence of sputter at the time of welding the electrode assembly and the current collector or the cover member can be suppressed.

The welded portion may have a recess on the welding surface.

With such a configuration, the welded portion has, on a welding surface, the recess which is recessed from an outer peripheral portion of the welding surface and hence, a volume of the welded portion can be made small. Accordingly, welding can be performed with small energy and hence, it is possible to suppress the occurrence of sputter and damage applied to the electrode assembly at the time of welding.

The first conductive member may have a wall which surrounds an outer periphery of the welding surface.

With such a configuration, the first conductive member has the wall which surrounds the outer periphery of the welding surface and hence, even when the welding surface is disposed at the position recessed from the outer surface of the first conductive member, rigidity of the periphery of the welded portion can be increased. Accordingly, welding can be performed with small energy, and a strength of the periphery of the welded portion of the first conductive member can be ensured.

The energy storage device may further include a second conductive member disposed on a side opposite to the first conductive member with the converged portion sandwiched between the first conductive member and the second conductive member, and having a projecting portion projecting toward the first conductive member, wherein the projecting portion may be welded at the welded portion.

With such a configuration, even in the configuration where the second conductive member is disposed on a side opposite to the first conductive member with the converged portion sandwiched between the first conductive member and the second conductive member, the projecting portion of the second conductive member projecting toward the first conductive member is welded and hence, welding can be performed by locally concentrating energy to the projecting portion. Accordingly, welding can be performed with small energy, and the occurrence of sputter and damage applied to the electrode assembly can be suppressed.

A space may be formed around the projecting portion between the electrode assembly and the second conductive member.

With such a configuration, the space is formed on the periphery of the projecting portion between the electrode assembly and the second conductive member and hence, heat generated by welding can be discharged to the space. Accordingly, damage applied to the electrode assembly can be suppressed.

The first conductive member may have a through hole which penetrates the first conductive member in a thickness direction, and the projecting portion may be inserted in the through hole together with the converged portion.

With such a configuration, the projecting portion of the second conductive member is inserted into the through hole formed in the first conductive member together with the converged portion and hence, the periphery of a portion to be welded of the converged portion can be inclined. In this manner, the periphery of the portion to be welded of the converged portion is inclined and hence, even when sputter occurs at the time of welding, it is possible to suppress the occurred sputter from invading into the inside of the electrode assembly.

The first conductive member may be disposed outside the electrode assembly.

With such a configuration, the welding surface is formed on the member disposed outside the electrode assembly and hence, the structure is provided where an instrument for welding can be easily arranged. Accordingly, a step of welding the electrode assembly and the current collector to each other can be performed easily.

An energy storage device according to an aspect of the present invention is an energy storage device including: an electrode assembly; and a first conductive member welded to the electrode assembly, wherein a welding surface of a welded portion where the electrode assembly and the first conductive member are welded to each other is disposed at a position recessed from an outer surface of the first conductive member, and the welded portion has, on the welding surface, a recessed portion recessed from an outer peripheral portion of the welding surface.

With such a configuration, in the welded portion where the electrode assembly and the first conductive member are welded to each other, the welding surface of the welded portion is disposed at the position recessed from the outer surface of the first conductive member, and the recessed portion which is further recessed from the outer peripheral portion of the welding surface is formed on the welding surface. Accordingly, a distance between the electrode assembly and the welding surface can be shortened. As a result, welding can be performed with small energy and hence, the occurrence of sputter and damage applied to the electrode assembly can be suppressed.

An energy storage device according to an aspect of the present invention includes: an electrode assembly formed by stacking plates; and a first conductive member welded to one of both surfaces of a converged portion on an end portion of the electrode assembly without covering the converged portion from an end portion side, wherein the first conductive member has: a thin wall thickness portion in which a through hole is formed at a welding scheduled position; and a wall which surrounds a periphery of the thin wall thickness portion.

With such a configuration, the first conductive member welded to the electrode assembly has the thin wall thickness portion where the through hole is formed at the welding scheduled position and hence, a volume of a portion to be welded with the electrode assembly can be made small. Further, the first conductive member has the wall which surrounds the outer periphery of the welding surface and hence, even with the configuration where the welding surface is disposed at the position recessed from the outer surface of the first conductive member, rigidity of the periphery of the welded portion can be increased. Accordingly, welding can be performed with small energy and, at the same time, a strength of the periphery of the welded portion of the first conductive member can be insured.

A method of manufacturing an energy storage device according to an aspect of the present invention includes: a disposing step of disposing a first conductive member on one of both surfaces of a converged portion on an end portion of an electrode assembly formed by stacking plates without covering the converged portion from an end portion side; and a welding step of welding the first conductive member disposed in the disposing step to the one surface of the converged portion on a thin wall thickness portion of the first conductive member.

With such a configuration, the first conductive member is welded to one of both surfaces of the converged portion without covering both surfaces of the converged portion from an end portion side of the electrode assembly. Accordingly, even when a width of the converged portion is shortened for increasing energy storage capacitance, the position in the converged portion which is a welding scheduled object can be disposed away from an end edge of the converged portion. Accordingly, it is possible to suppress welding of a portion including the end edge of the converged portion. In this manner, it is possible to suppress welding of the end portion of the converged portion.

The first conductive member may have: the thin wall thickness portion in which a through hole is formed; and a wall which is formed around the thin wall thickness portion, and the welding may be performed on the thin wall thickness portion around the through hole in the welding step.

With such a configuration, the first conductive member to be welded to the electrode assembly has the thin wall thickness portion where the through hole is formed at the welding scheduled position and hence, a volume of a portion to be welded to the electrode assembly can be made small. Further, the first conductive member has the wall which surrounds the outer periphery of the welding surface and hence, even when the configuration is adopted where the welding surface is arranged at the position recessed from the outer surface of the first conductive member, rigidity of the periphery of the welded porting can be increased. Accordingly, welding can be performed with small energy and, at the same time, a strength of the periphery of the welded portion of the first conductive member can be ensured.

The configuration of the above-mentioned first conductive member may be realized in the form of the current collector or in the form of the cover member.

Hereinafter, an energy storage device according to an embodiment of the present invention is described with reference to drawings. The embodiment described hereinafter shows one specific examples of the present invention. In the embodiment, numerical values, shapes, materials, constitutional elements, arrangement positions and connection states of the constitutional elements and the like are merely examples, and these are not intended to be used for limiting the present invention. Further, out of the constitutional elements in the embodiment described hereinafter, the constitutional elements which are not described in independent claims describing the uppermost concept are described as arbitrary constitutional elements. The respective drawings are views for describing an energy storage apparatus, and are not always described strictly accurately.

Embodiment

First, the configuration of an energy storage device 10 is described.

Figure 2:
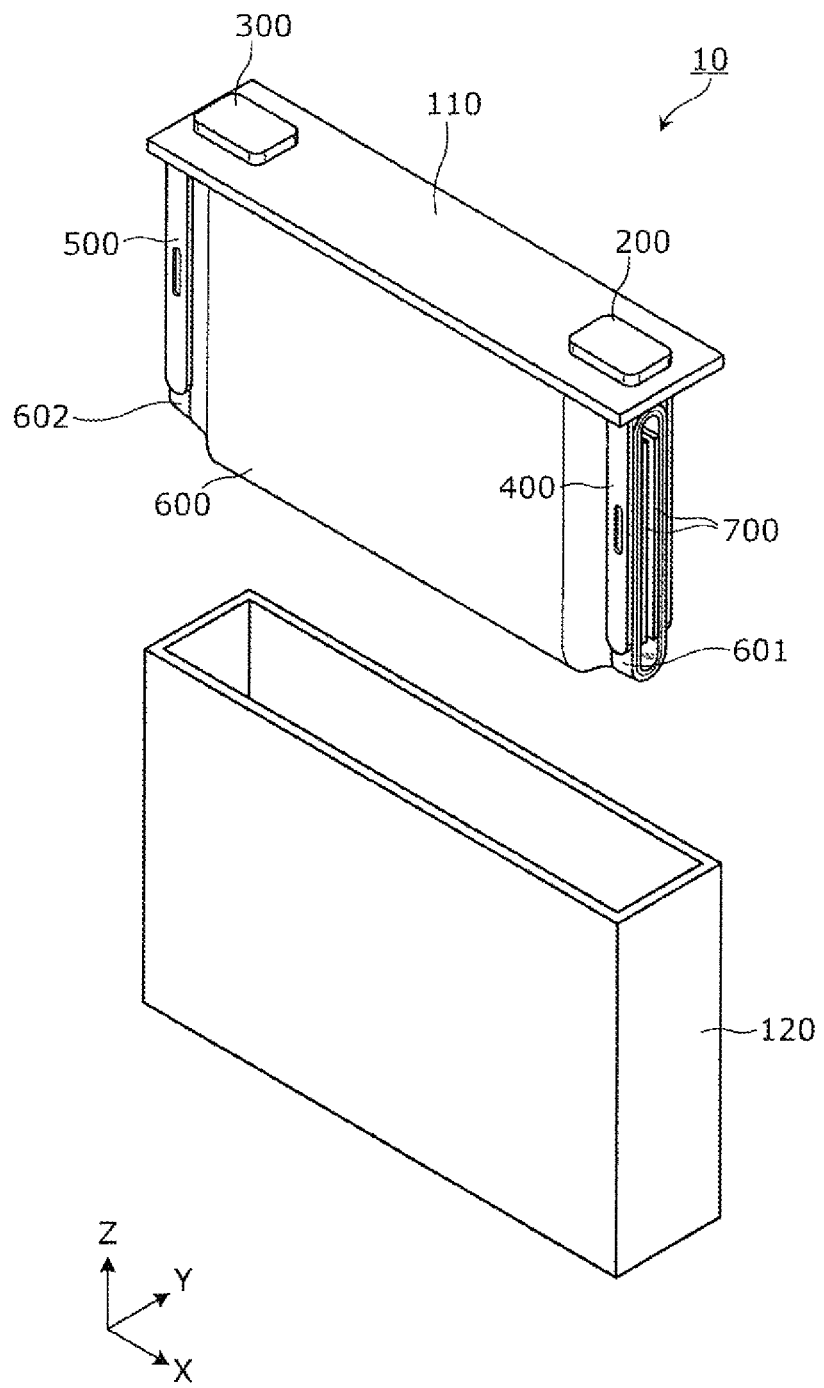
FIG. 2 is a perspective view showing respective constitutional elements which the energy storage device includes in a state where a container body of a container of the energy storage device according to the embodiment of the present invention is separated.
Figure 3:
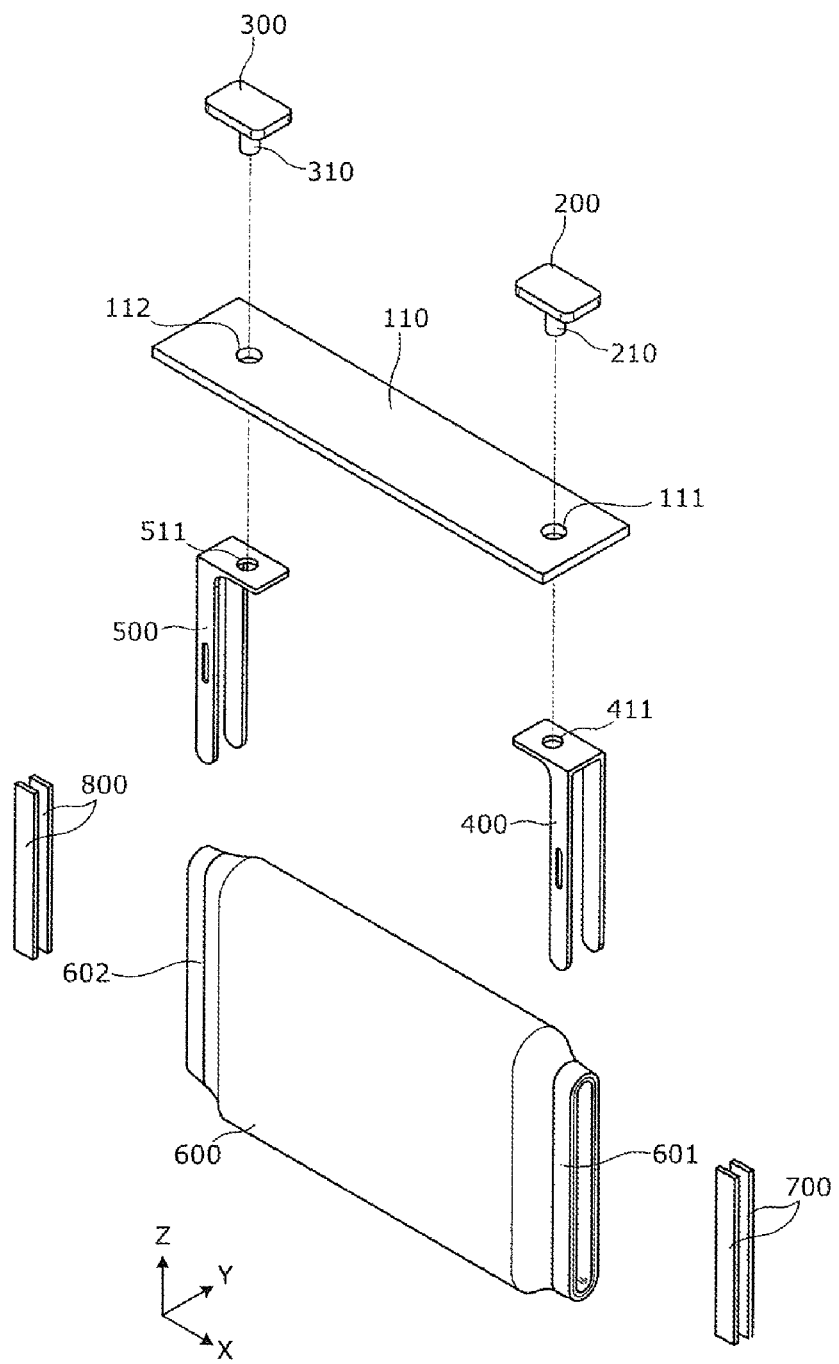
FIG. 3 is an exploded perspective view showing respective constitutional elements in a state where the energy storage device according to the embodiment of the present invention is disassembled.

FIG. 1 is a perspective view schematically showing an external appearance of the energy storage device 10 according to the embodiment of the present invention. FIG. 2 is a perspective view showing respective constitutional elements which the energy storage device 10 includes in a state where a container body 120 of a container 100 of the energy storage device 10 according to the embodiment of the present invention is separated. FIG. 3 is an exploded perspective view showing respective constitutional elements in a state where the energy storage device 10 according to the embodiment of the present invention is disassembled. FIG. 3 shows the energy storage device in a state where the container body 120 of the container 100 is omitted.

The energy storage device 10 is a secondary battery which can charge electricity and discharge electricity. To be more specific, the energy storage device 10 is a nonaqueous electrolyte secondary battery such as a lithium ion secondary battery. The energy storage device 10 is applicable to an electric vehicle (EV), a plug-in hybrid electric vehicle (PHEV), a hybrid electric vehicle (HEV) or the like, for example. The energy storage device 10 is not limited to a nonaqueous electrolyte secondary battery, and may be a secondary battery other than a nonaqueous electrolyte secondary battery, or may be a capacitor. Further, the energy storage device 10 may be a primary battery which a user can use stored electricity without charging.

As shown in these drawings, the energy storage device 10 includes the container 100, a positive electrode terminal 200, and a negative electrode terminal 300. Further, a positive electrode current collector 400, a negative electrode current collector 500, an electrode assembly 600, and cover members 700, 800 are accommodated in the inside of the container 100.

A liquid such as an electrolyte solution (nonaqueous electrolyte) is sealed in the container 100 of the energy storage device 10. However, the illustration of such a liquid is omitted. As an electrolyte solution sealed in the container 100, the kind of the electrolyte solution is not particularly limited and any kind of electrolyte solution can be selected from various kinds of electrolyte solutions provided that performance of the energy storage device 10 is not impaired.

The container 100 is formed of the bottomed container body 120 having a rectangular cylindrical shape; and a lid body 110 which is a plate-like member which closes an opening of the container body 120. The container 100 is configured such that the inside of the container 100 can be hermetically sealed by joining the lid body 110 and the container body 120 to each other by welding or the like after the electrode assembly 600 and the like are accommodated in the inside of the container 100. Although a material for forming the lid body 110 and the container body 120 is not particularly limited, it is preferable that the lid body 110 and the container body 120 be made of weldable metal such as stainless steel, aluminum or an aluminum alloy, for example.

The electrode assembly 600 is a member which includes a positive electrode, a negative electrode, and a separator, and can store electricity. The positive electrode is formed by forming a positive active material layer on a positive electrode base material layer which is formed of an elongated strip-shaped metal foil made of aluminum, an aluminum alloy or the like. The negative electrode is formed by forming a negative active material layer on a negative electrode base material layer which is an elongated strip-shaped metal foil made of copper, a copper alloy or the like. The separator is formed of a microporous sheet made of a resin.

As a positive active material for forming the positive active material layer or a negative active material for forming the negative active material layer, a known positive active material or a known negative active material can be suitably used provided that the positive active material or the negative active material can occlude and discharge lithium ions.

Figure 6:
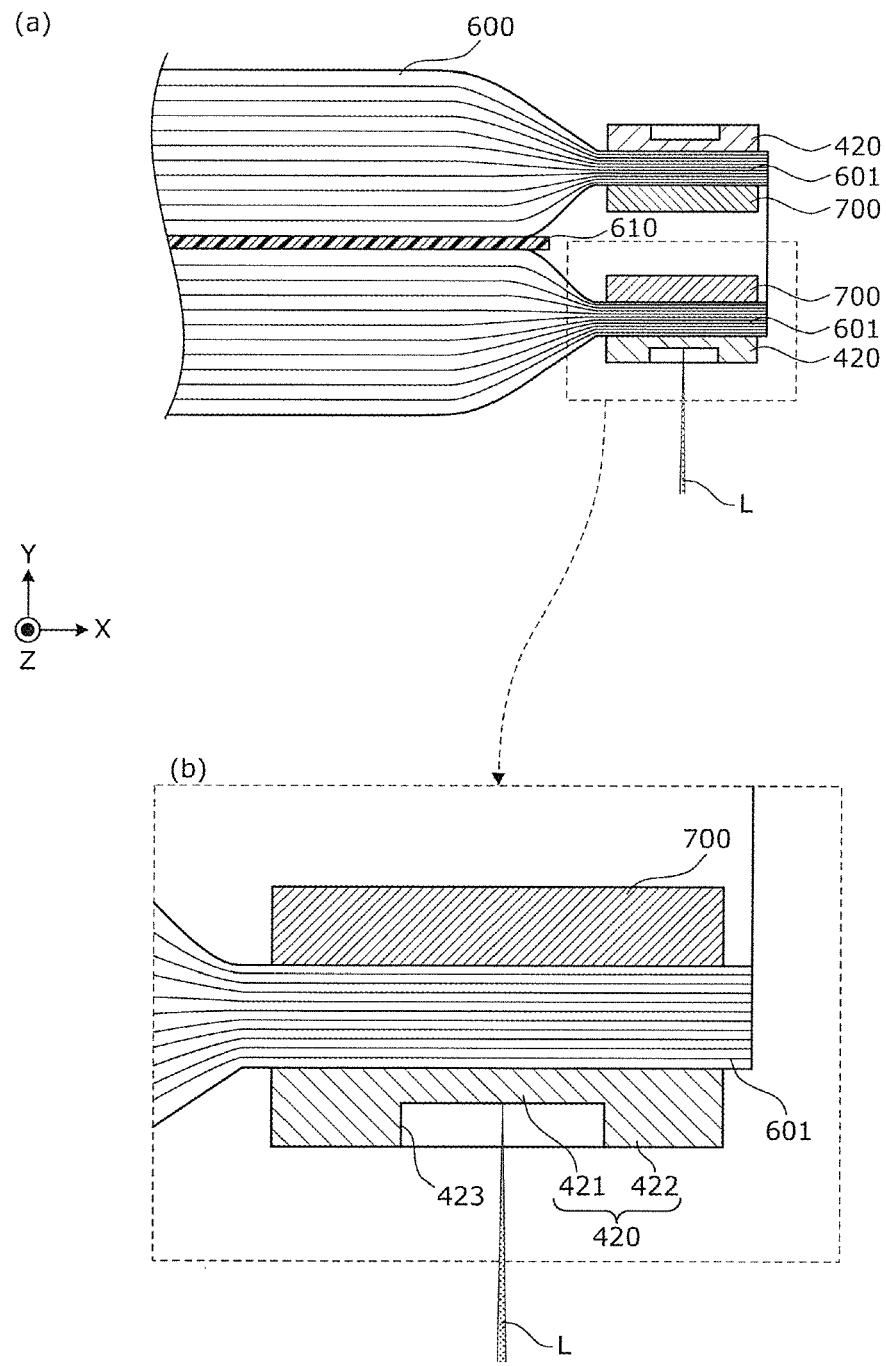
FIG. 6 is a cross-sectional view of the welded portion between the electrode assembly side arrangement portion and the converged portion according to the embodiment of the present invention taken along line VI-VI.

The electrode assembly 600 is formed by winding a layered member formed of the positive electrode, the negative electrode and the separator sandwiched between the positive electrode and the negative electrode around a winding core 610 (see FIG. 6). To be more specific, the electrode assembly 600 is formed such that the positive electrode and the negative electrode are wound with the separator sandwiched therebetween in a state where the positive electrode and the negative electrode are displaced from each other in a winding axis (an imaginary axis parallel to the X axis direction in this embodiment) direction. That is, the electrode assembly 600 is a winding-type electrode assembly.

Although the electrode assembly 600 is shown in an elongated circular shape in the drawing, the electrode assembly 600 may have a circular shape or an elliptical shape. Further, the electrode assembly 600 is not limited to a winding-type electrode assembly, and may be formed by stacking flat-plate-like plates.

The electrode assembly 600 has a positive-electrode-side converged portion 601 and a negative-electrode-side converged portion 602 on both ends thereof in the winding axis direction respectively. The converged portion 601 and the converged portion 602 are end edge portions which are formed by projecting the positive electrode and the negative electrode of the electrode assembly 600 in the direction that the positive electrode and the negative electrode are displaced from each other, and are portions where an active material is not applied by coating so that the base material layer is exposed (portions where an active material layer is not formed) (active material layer non-forming portions). That is, the converged portion 601 is an end portion of the electrode assembly on a positive-electrode-side where active material layer non-forming portions of the positive electrode are stacked and converged, and the converged portion 602 is an end portion of the electrode assembly on a negative electrode side where active material layer non-forming portions of the negative electrode are stacked and converged. The active material layer non-forming portion of the positive electrode is a portion of the positive electrode where a positive active material is not applied by coating and the positive electrode base material layer is exposed (the positive active material layer is not formed), and the active material layer non-forming portion of the negative electrode is a portion of the negative electrode where the negative active material is not applied by coating and the negative electrode base material layer is exposed (the negative active material layer is not formed).

The positive electrode terminal 200 is an electrode terminal which is electrically connected to the positive electrode of the electrode assembly 600, and the negative electrode terminal 300 is an electrode terminal which is electrically connected to the negative electrode of the electrode assembly 600. That is, the positive electrode terminal 200 and the negative electrode terminal 300 are metal-made electrode terminals through which electricity stored in the electrode assembly 600 is discharged to a space outside the energy storage device 10 and through which electricity is introduced into a space inside the energy storage device 10 for storing the electricity in the electrode assembly 600.

The positive electrode terminal 200 and the negative electrode terminal 300 are mounted on the lid body 110 disposed above the electrode assembly 600. To be more specific, as shown in FIG. 3, the positive electrode terminal 200 is fixed to the lid body 110 together with the positive electrode current collector 400 by inserting a projecting portion 210 of the positive electrode terminal 200 into a through hole 111 formed in the lid body 110 and a through hole 411 formed in the positive electrode current collector 400 and by swaging the projecting portion 210. In the same manner, the negative electrode terminal 300 is fixed to the lid body 110 together with the negative electrode current collector 500 by inserting a projecting portion 310 of the negative electrode terminal 300 into a through hole 112 formed in the lid body 110 and a through hole 511 formed in the negative electrode current collector 500 and by swaging the projecting portion 310. Although gaskets and the like are also disposed in this embodiment, these constitutional elements are omitted from the drawing.

The positive electrode current collector 400 is a member which has conductivity and rigidity and is disposed on a positive-electrode-side of the electrode assembly 600, and is electrically connected to the positive electrode terminal 200 and the positive electrode of the electrode assembly 600. The positive electrode current collector 400 is made of aluminum or an aluminum alloy in the same manner as the positive electrode base material layer of the electrode assembly 600.

The negative electrode current collector 500 is a member which has conductivity and rigidity and is disposed on a negative electrode side of the electrode assembly 600, and is electrically connected to the negative electrode terminal 300 and the negative electrode of the electrode assembly 600. The negative electrode current collector 500 is made of copper or a copper alloy in the same manner as the negative electrode base material layer of the electrode assembly 600.

The cover member 700 is a plate-like member which is made of metal such as aluminum or an aluminum alloy and is disposed inside the positive-electrode-side converged portion 601 of the electrode assembly 600. The cover member 700 is joined to the converged portion 601 together with the positive electrode current collector 400 in a state where the converged portion 601 is sandwiched between the cover member 700 and the positive electrode current collector 400. The cover member 800 is a plate-like member which is made of metal such as copper or a copper alloy and is disposed inside the negative-electrode-side converged portion 602 of the electrode assembly 600. The cover member 800 is joined to the converged portion 602 together with the negative electrode current collector 500 in a state where the converged portion 602 is sandwiched between the cover member 800 and the negative electrode current collector 500.

Next, the configurations of the positive electrode current collector 400 and the negative electrode current collector 500 are described in detail. The positive electrode current collector 400 and the negative electrode current collector 500 substantially have the same configuration. Accordingly, only the description of the positive electrode current collector 400 is made hereinafter, and the description of the negative electrode current collector 500 is omitted.

Figure 4:
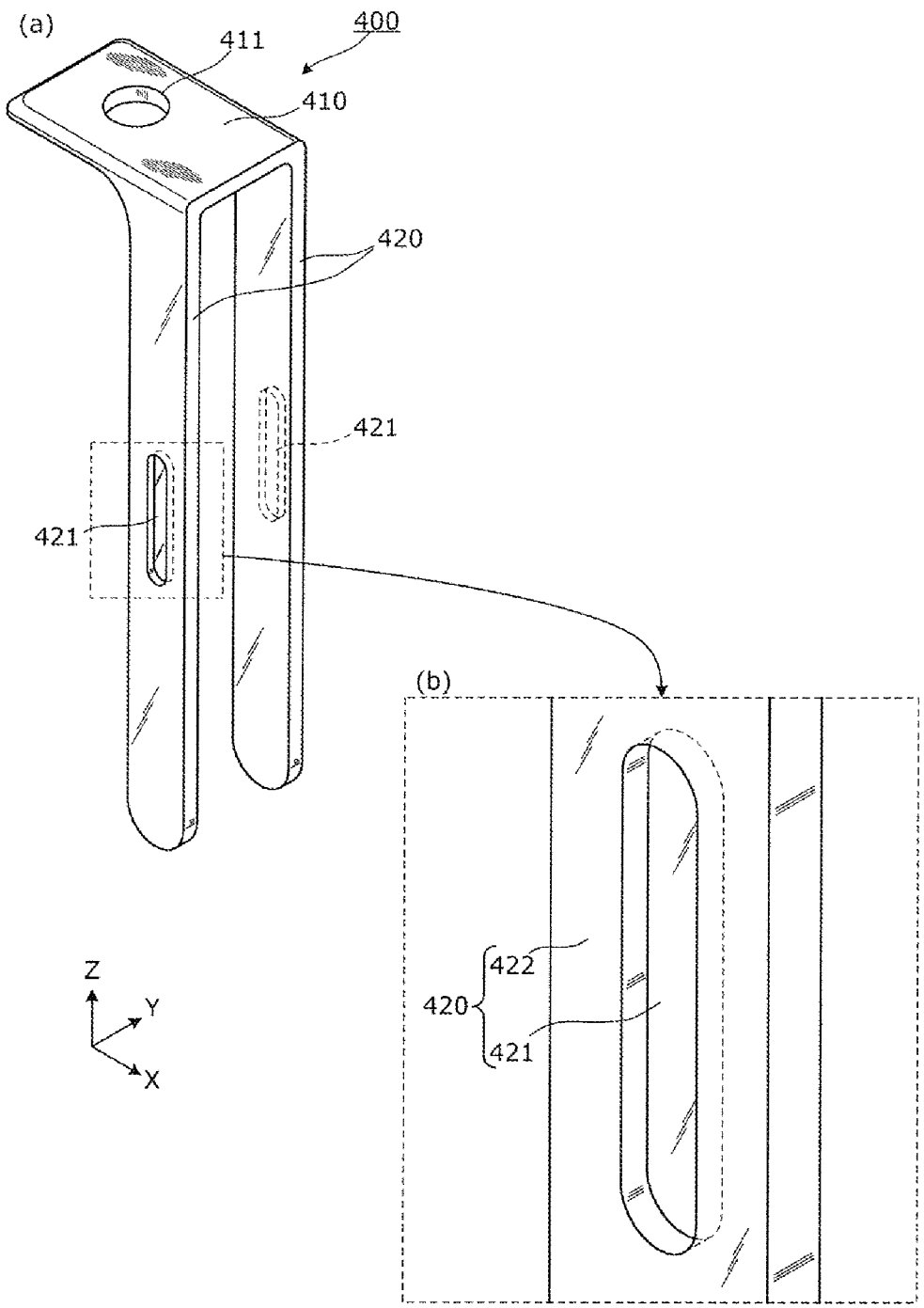
FIG. 4 is a perspective view showing the configuration of a positive electrode current collector according to the embodiment of the present invention.

FIG. 4 is a perspective view showing the configuration of the positive electrode current collector 400 according to the embodiment of the present invention. (a) of FIG. 4 is a perspective view showing the overall configuration of the positive electrode current collector 400, and (b) of FIG. 4 is an enlarged view of a portion of the positive electrode current collector 400 where the positive electrode current collector 400 is welded to the electrode assembly 600.

As shown in (a) of FIG. 4, the positive electrode current collector 400 includes a terminal-side arrangement portion 410, and two electrode-assembly-side arrangement portions 420.

The terminal-side arrangement portion 410 is a flat-plate-like portion disposed on a positive electrode terminal 200 side (a plus side in the Z axis direction). The through hole 411 into which the projecting portion 210 of the positive electrode terminal 200 is inserted is formed in the terminal-side arrangement portion 410. The terminal-side arrangement portion 410 is fixed to the lid body 110 by inserting the projecting portion 210 into the through hole 111 formed in the lid body 110 and by swaging the projecting portion 210 together with the lid body 110. That is, the projecting portion 210 is a connecting portion for connecting the positive electrode terminal 200 and the positive electrode current collector 400 to each other.

Two electrode-assembly-side arrangement portions 420 are elongated plate-like portions which are connected to both side surface portions of the terminal-side arrangement portion 410 respectively and extend in the Z axis direction. The electrode-assembly-side arrangement portions 420 are disposed on a converged portion 601 side at a positive-electrode-side of the electrode assembly 600. To be more specific, the electrode-assembly-side arrangement portions 420 are portions which are disposed in a downwardly extending manner toward the electrode assembly 600 (toward a minus side in the Z axis direction) from both side surfaces of the terminal-side arrangement portion 410 disposed opposite to each other in the Y axis direction, and are joined to the converged portion 601 of the electrode assembly 600. That is, the electrode-assembly-side arrangement portions 420 are members extending in the Z axis direction and having a surface parallel to an X-Z plane respectively. The electrode-assembly-side arrangement portions 420 are joined to the converged portion 601 of the electrode assembly 600 by way of such surfaces parallel to the X-Z plane and hold the electrode assembly 600 in a suspending manner in the inside of the container 100.

As shown in (b) of FIG. 4, each of two electrode-assembly-side arrangement portions 420 has a thin wall thickness portion 421 and a large wall thickness portion 422 disposed adjacently and parallel to the thin wall thickness portion 421 and having a larger wall thickness than the thin wall thickness portion 421. The thin wall thickness portion 421 is a portion where the electrode-assembly-side arrangement portion 420 is welded to the converged portion 601. The large wall thickness portion 422 is formed so as to surround the thin wall thickness portion 421. Further, a stepped portion is formed between the thin wall thickness portion 421 and the large wall thickness portion 422.

The thin wall thickness portion 421 is disposed at a position recessed from an outer surface (a surface outside in the Y axis direction) of the electrode-assembly-side arrangement portion 420. That is, outer surfaces of two electrode-assembly-side arrangement portions 420 respectively have a recessed shape at the thin wall thickness portion 421. On the other hand, inner surfaces (surfaces inside in the Y axis direction) of two electrode-assembly-side arrangement portions 420 respectively form an approximately coplanar flat surface on the thin wall thickness portion 421 and the large wall thickness portion 422. That is, the inner surfaces of two electrode-assembly-side arrangement portions 420 are respectively formed into a shape where the inner surfaces are wholly contactable with the outer surfaces of the converged portion 601 of the electrode assembly 600.

Next, a welded portion between the positive electrode current collector 400 and the electrode assembly 600 and a welded portion between the negative electrode current collector 500 and the electrode assembly 600 are described. As described above, the positive electrode current collector 400 and the negative electrode current collector 500 substantially have the same configuration. Accordingly, also in the description made hereinafter, the welded portion between the positive electrode current collector 400 and the converged portion 601 of the electrode assembly 600 is described, and the description of the welded portion between the negative electrode current collector 500 and the converged portion 602 of the electrode assembly 600 is omitted. Further, the cover member 700 and the cover member 800 have substantially the same configuration and hence, the description of the cover member 800 is omitted.

Figure 5:
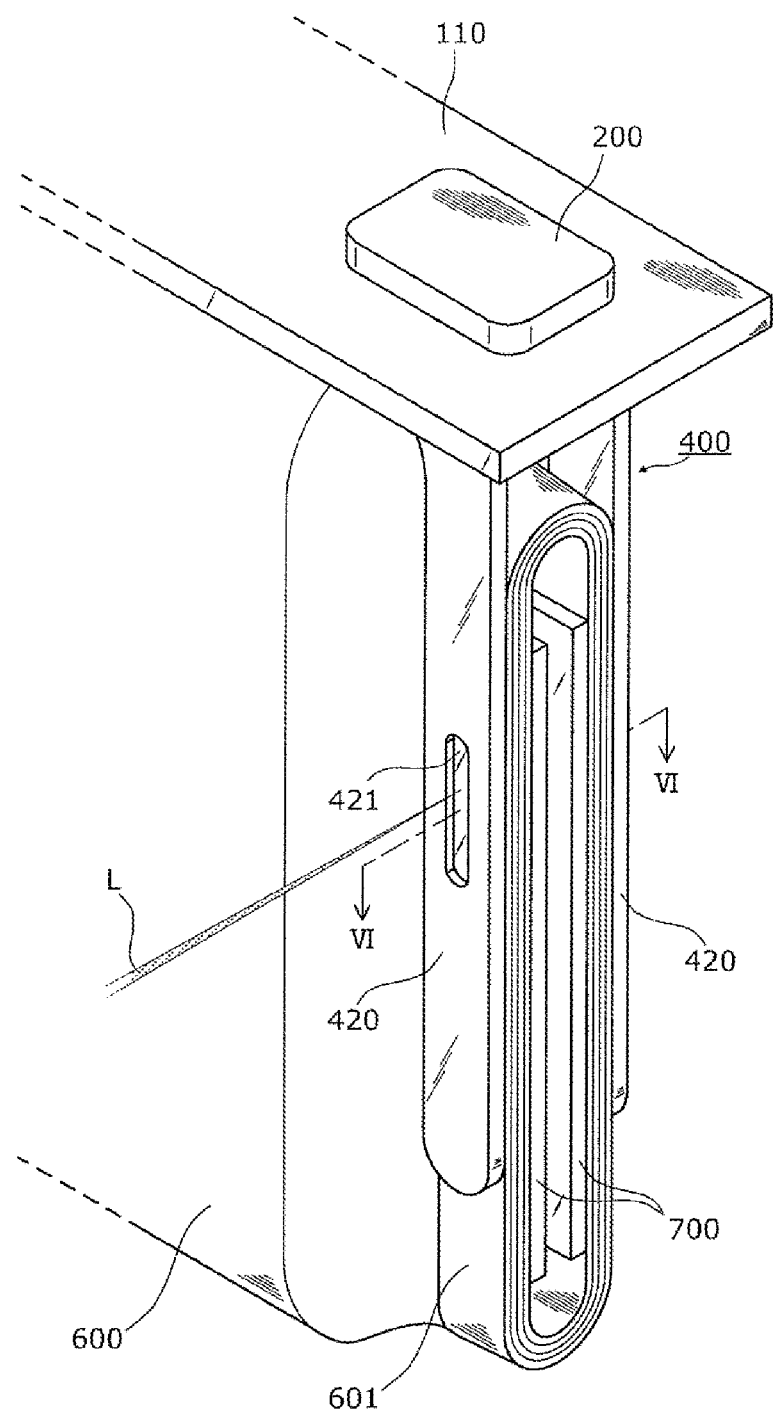
FIG. 5 is a perspective view for explaining a welded portion between an electrode assembly side arrangement portion of the positive electrode current collector and a converged portion of the electrode assembly according to the embodiment of the present invention.
Figure 7:
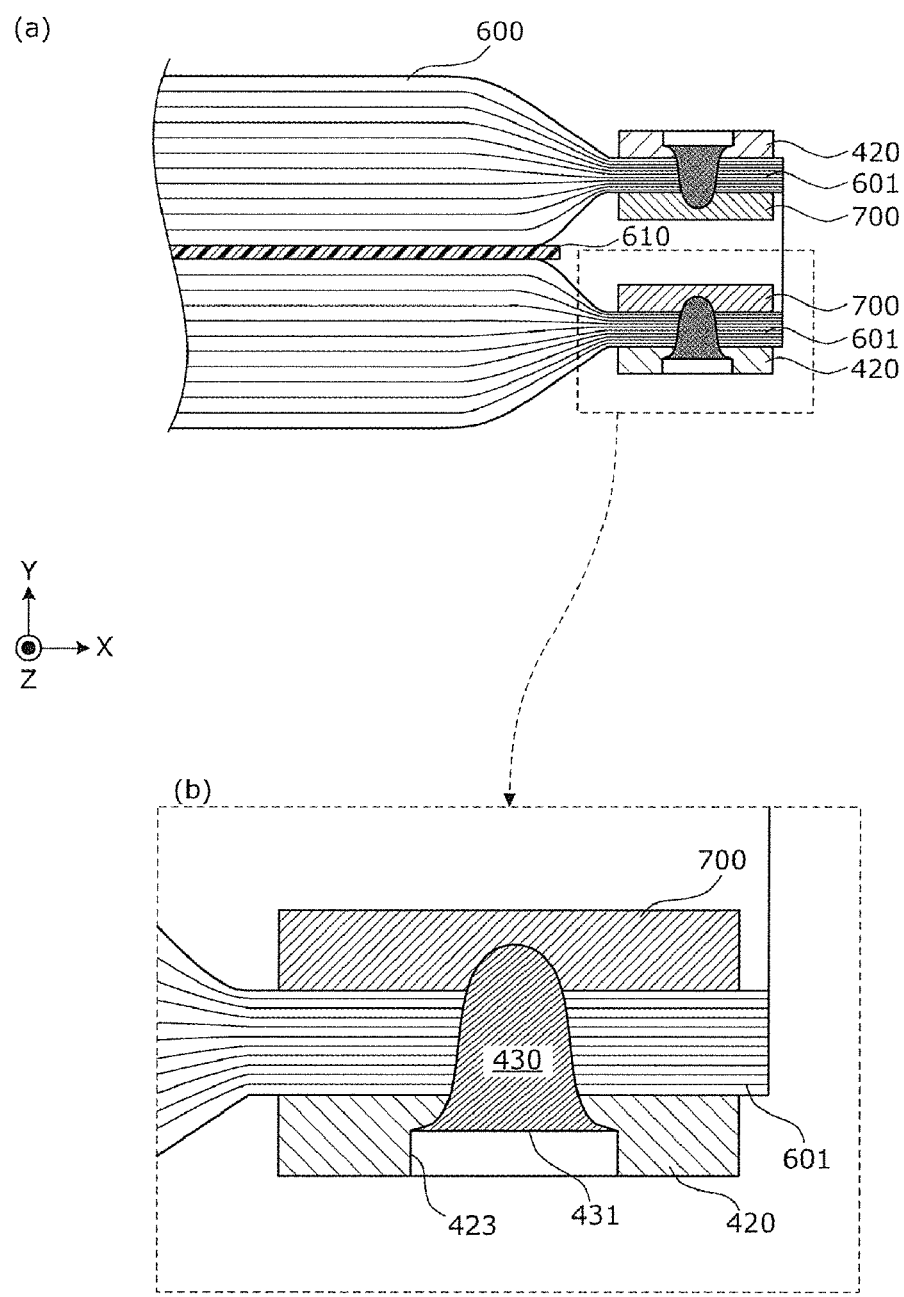
FIG. 7 is a cross-sectional view of the welded portion after the electrode assembly side arrangement portion and the converged portion shown in FIG. 6 are welded to each other.

FIG. 5 is a perspective view for describing the welded portion between the electrode-assembly-side arrangement portions 420 of the positive electrode current collector 400 and the converged portion 601 of the electrode assembly 600 according to the embodiment of the present invention. FIG. 6 is a cross-sectional view of the welded portion between the electrode-assembly-side arrangement portions 420 and the converged portion 601 according to the embodiment of the present invention taken along line VI-VI in FIG. 5. FIG. 7 is a cross-sectional view of the welded portions after the electrode-assembly-side arrangement portions 420 and the converged portion 601 shown in FIG. 6 are welded to each other. In the above-mentioned drawings, (a) of FIG. 6 is a cross-sectional view showing the overall configuration of the electrode-assembly-side arrangement portions 420 and the converged portion 601, and (b) of FIG. 6 is an enlarged view showing the welded portion between the electrode-assembly-side arrangement portion 420 and the converged portion 601 in an enlarged manner. (a) of FIG. 7 is a view showing the configuration in (a) of FIG. 6 after welding is performed, and (b) of FIG. 7 is a view showing the configuration in (b) of FIG. 6 after welding is performed.

The positive electrode current collector 400 is disposed at the position where the electrode-assembly-side arrangement portions 420 are brought into contact with an outer surface of the converged portion 601 of the electrode assembly 600 in a state where the positive electrode current collector 400 is fixed to the lid body 110 by the positive electrode terminal 200. The converged portion 601 of the electrode assembly 600 includes split portions formed by splitting the converged portion 601 in two in a stacking direction (Y axis direction) of the plates from the center of winding of the plates and the separator which are wound in a flat shape. One of two electrode-assembly-side arrangement portions 420 of the positive electrode current collector 400 is disposed at the position where the one of two electrode-assembly-side arrangement portions 420 is brought into contact with an outer surface of one of two split portions of the converged portion 601, and the other of two electrode-assembly-side arrangement portions 420 is disposed at the position where the other of two electrode-assembly-side arrangement portions 420 is brought into contact with an outer surface of the other of the two split portions of the converged portion 601. That is, one electrode-assembly-side arrangement portion 420 is a first conductive member which is disposed on one surface side out of both surfaces (both outer surfaces in the Y axis direction) of the converged portion 601 without covering the converged portion 601 of the electrode assembly 600 from an end portion side (a plus side in the X axis direction) of the electrode assembly 600.

The cover members 700 are second conductive members each of which is disposed on a side opposite to the electrode-assembly-side arrangement portions 420 which are the first conductive members in a state where the converged portion 601 of the electrode assembly 600 is sandwiched between the cover members 700 and the electrode-assembly-side arrangement portions 420. The cover members 700 are two elongated plate-like members disposed inside two split portions of the converged portion 601. Outer surfaces of the cover members 700 are formed in an approximately flat surface so as to be wholly contactable with the inner surface of the converged portion 601, and are disposed in contact with the inner surface of the converged portion 601.

For example, the electrode-assembly-side arrangement portion 420 is joined to the positive-electrode-side converged portion 601 of the electrode assembly 600 at the thin wall thickness portion 421 by laser welding where a laser beam L shown in FIG. 5 and FIG. 6 is irradiated to the thin wall thickness portion 421 which becomes a welding scheduled object. In this operation, not only the electrode-assembly-side arrangement portion 420 and the converged portion 601 but also the cover member 700 disposed on a side opposite to the electrode-assembly-side arrangement portion 420 with respect to the converged portion 601 is joined together with the electrode-assembly-side arrangement portion 420 and the converged portion 601. In this embodiment, the kind of welding is not limited to laser welding, and electron beam welding, ultrasonic welding, resistant welding or the like may be used. However, there is a concern that the thin wall thickness portion 421 is deformed due to vibration or pressurization by an electrode rod at the time of welding and hence, laser welding is preferably used.

By joining the electrode-assembly-side arrangement portion 420 of the positive electrode current collector 400 and the converged portion 601 of the electrode assembly 600 to each other by laser welding in this manner, a welded portion 430 shown in FIG. 7 is formed. The welded portion 430 is formed in a state where the welded portion 430 reaches the cover member 700 through the electrode-assembly-side arrangement portion 420 and the converged portion 601 thus joining the electrode-assembly-side arrangement portion 420, the converged portion 601, and the cover member 700 to each other.

Laser welding is performed at the thin wall thickness portion 421 of the electrode-assembly-side arrangement portion 420 and hence, the welded portion 430 is formed at the position corresponding to the thin wall thickness portion 421 of the electrode-assembly-side arrangement portion 420. That is, a welding surface 431 of the welded portion 430 is disposed at the position recessed from the outer surface of the electrode-assembly-side arrangement portion 420. In this embodiment, the welding surface 431 is the front surface of the welded portion 430. In the electrode-assembly-side arrangement portion 420, the large wall thickness portion 422 is formed so as to surround the thin wall thickness portion 421, and a stepped portion is formed between the thin wall thickness portion 421 and the large wall thickness portion 422. Accordingly, an outer periphery of the welding surface 431 is surrounded by a wall 423.

As has been described heretofore, in the energy storage device 10 according to the embodiment of the present invention, each of two electrode-assembly-side arrangement portions 420 of the positive electrode current collector 400 which form the first conductive members is welded to one surface out of both surfaces of the converged portion 601 without covering both surfaces of the converged portion 601 of the electrode assembly 600 from an end portion side of the electrode assembly 600. Accordingly, even when a width (a length from an end edge) of the converged portion 601 is made short for increasing energy storage capacitance, the position which becomes a welding scheduled object at the converged portion 601 can be disposed away from an end edge of the converged portion 601. Accordingly, it is possible to suppress welding of a portion which includes the end edge of the converged portion 601.

The welding surface 431 of the welded portion 430 where the electrode assembly 600 and the electrode-assembly-side arrangement portion 420 of the positive electrode current collector 400 are welded to each other is disposed at the position recessed from the outer surface of the electrode-assembly-side arrangement portion 420. That is, a distance between the electrode assembly 600 and the welding surface 431 can be shortened. Accordingly, welding can be performed with small energy.

In this manner, welding of the end edge of the converged portion 601 can be suppressed and welding can be performed with small energy and hence, lowering of performance of the energy storage device can be suppressed by suppressing the occurrence of sputter or the like at the time of welding.

The electrode-assembly-side arrangement portion 420 has the wall 423 which surrounds the outer periphery of the welding surface 431 and hence, even when the welding surface 431 is disposed at the position recessed from the outer surface of the electrode-assembly-side arrangement portion 420, rigidity of the periphery of the welded portion 430 can be increased. Accordingly, welding can be performed with small energy, and a strength of the periphery of the welded portion 430 of the electrode-assembly-side arrangement portion 420 can be ensured.

The electrode-assembly-side arrangement portion 420 is disposed outside the converged portion 601 of the electrode assembly 600.

That is, the welding surface 431 is formed on the electrode-assembly-side arrangement portion 420 disposed outside the electrode assembly 600 and hence, the structure is provided where an instrument for welding can be easily arranged. Accordingly, a step of welding the electrode assembly 600 and the electrode-assembly-side arrangement portion 420 of the positive electrode current collector 400 to each other can be performed easily.

The above-mentioned advantageous effects can be acquired not only with respect to the positive electrode current collector 400 and the converged portion 601 but also with respect to the negative electrode current collector 500 and the converged portion 602.

Although the energy storage device 10 according to the embodiment of the present invention has been described heretofore, the present invention is not limited to the above-mentioned embodiment. That is, it should be construed that the embodiment disclosed in this specification is only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

(1) Modification 1

A modification 1 of the embodiment of the present invention is described.

The above-mentioned embodiment adopts the configuration where a through hole is not formed in the thin wall thickness portion 421 which becomes a welding scheduled object of the electrode-assembly-side arrangement portion 420 of the positive electrode current collector 400. However, for example, a positive electrode current collector where a through hole is formed in a thin wall thickness portion may be adopted. A positive electrode current collector 400A where a through hole 424A is formed in a thin wall thickness portion 421A is described with reference to FIG. 8 to FIG. 11.

Figure 8:
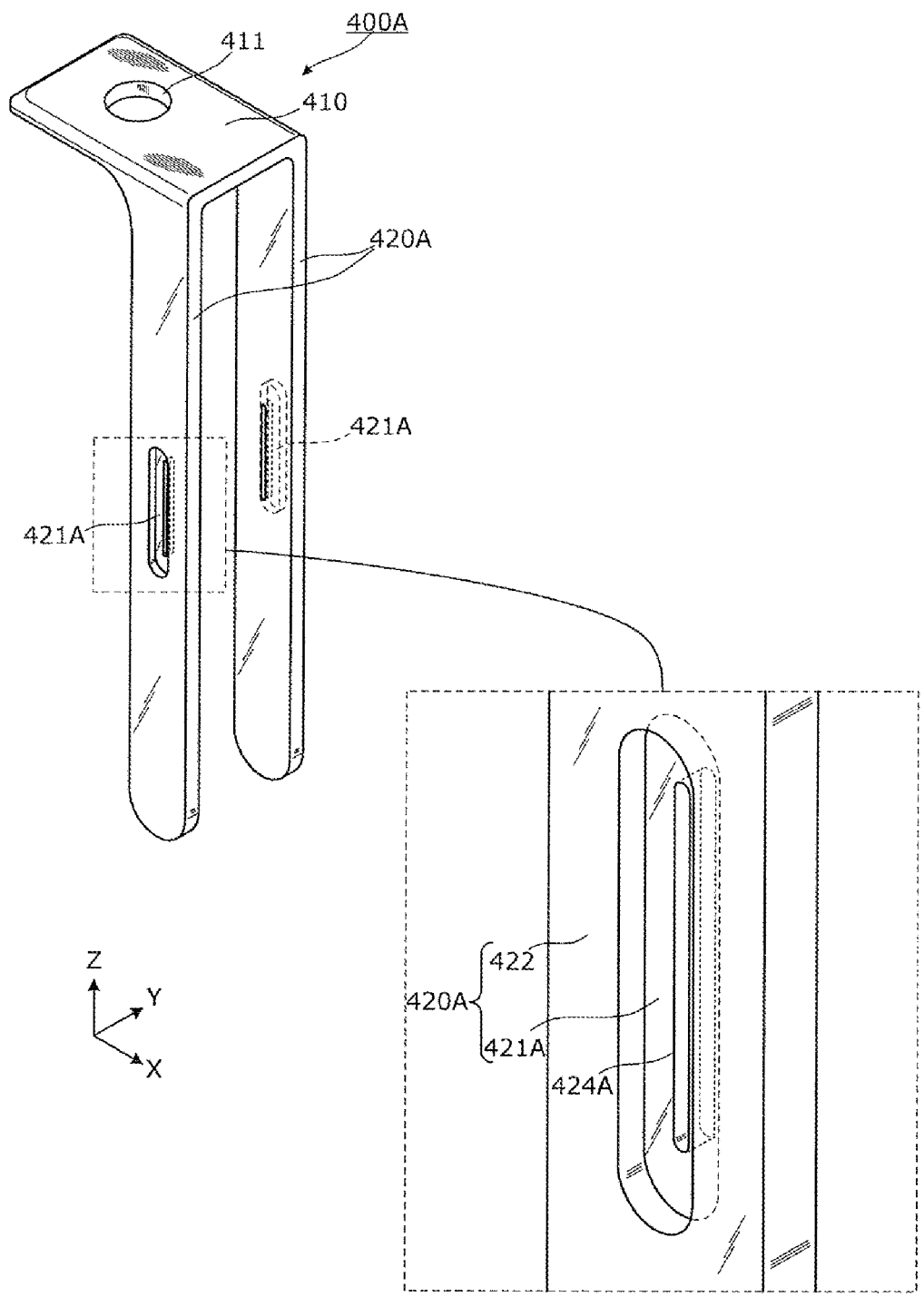
FIG. 8 is a perspective view showing the configuration of a positive electrode current collector according to a modification 1 of the embodiment of the present invention.
Figure 9:
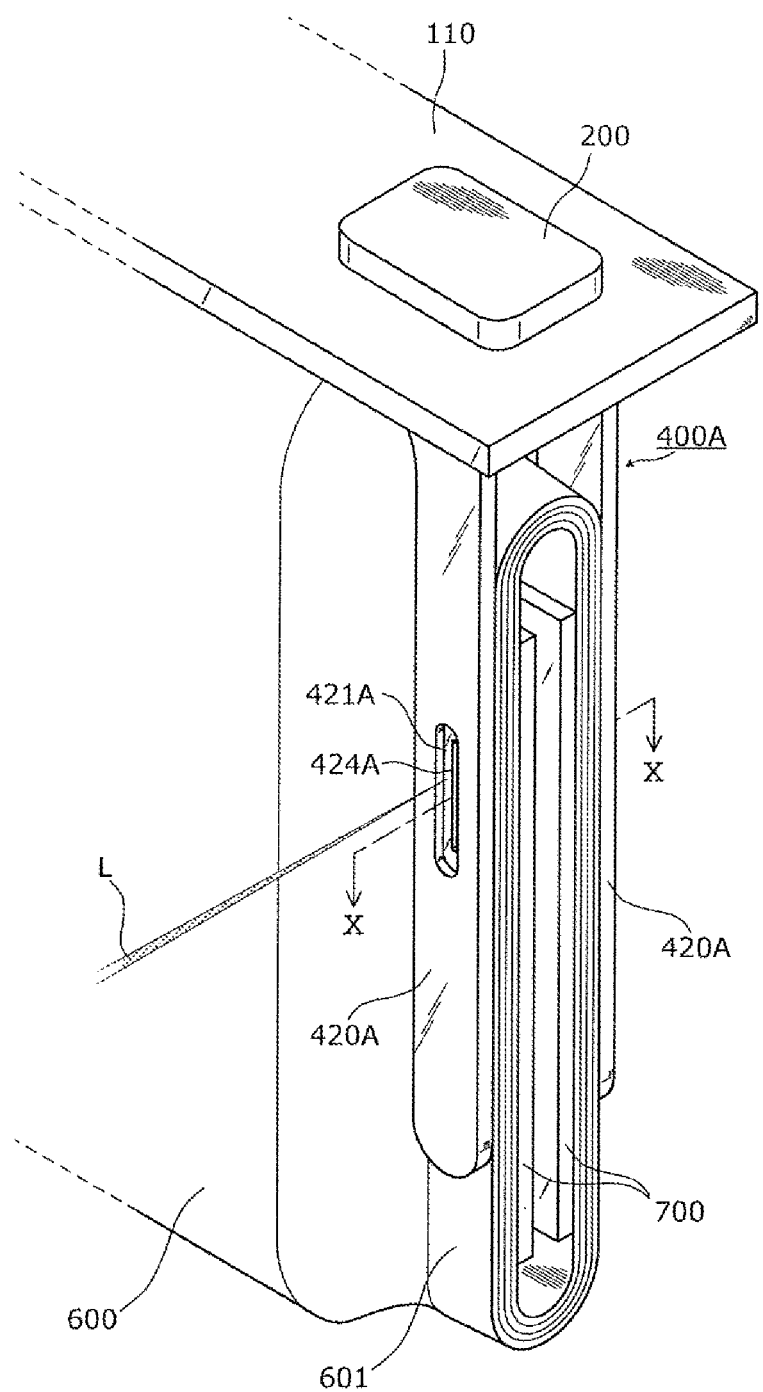
FIG. 9 is a perspective view for explaining a welded portion between a positive electrode current collector and a converged portion of an electrode assembly according to the modification 1 of the embodiment of the present invention.
Figure 10:
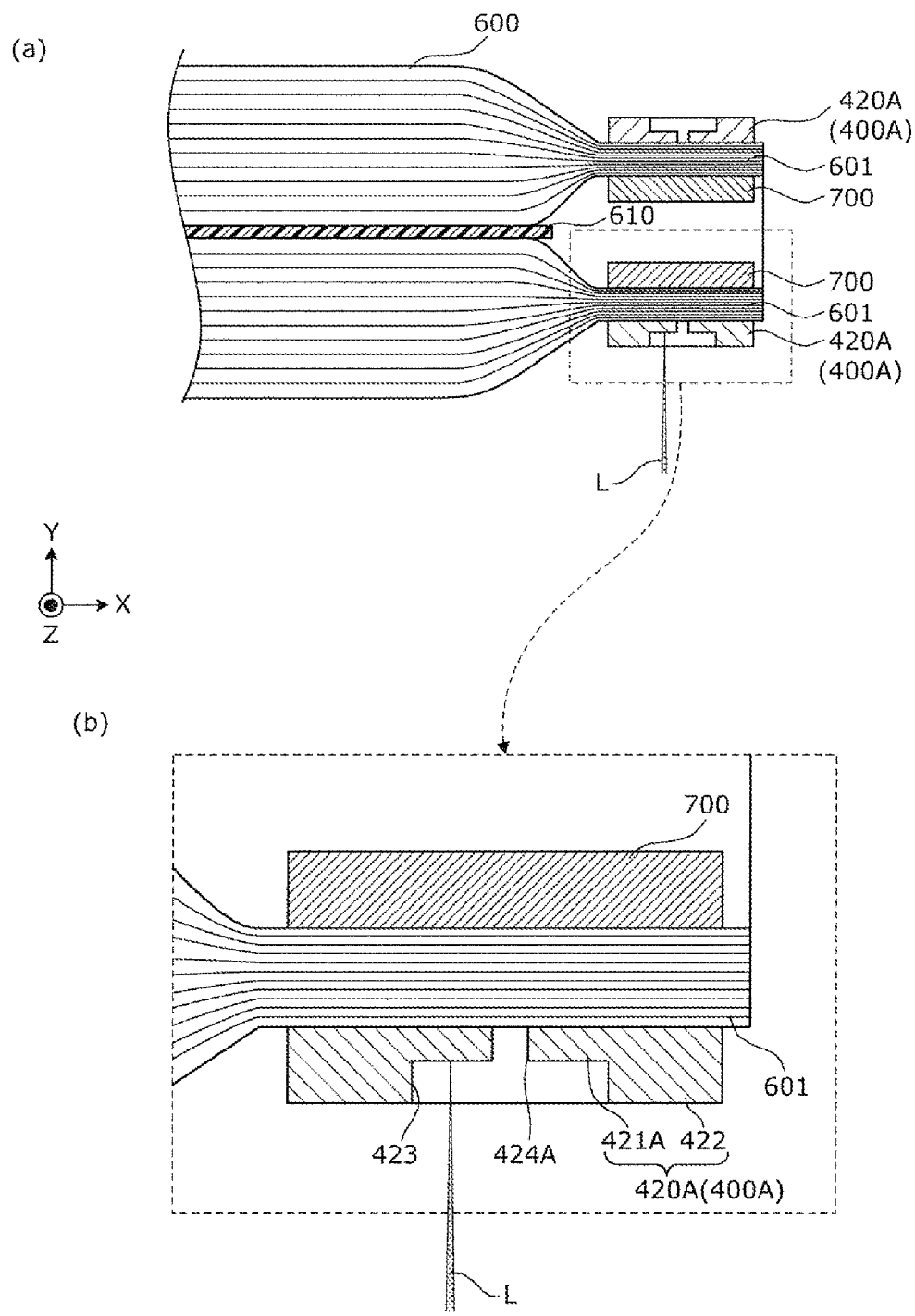
FIG. 10 is a cross-sectional view of a welded portion between an electrode assembly side arrangement portion and the converged portion according to the modification 1 of the embodiment of the present invention taken along line X-X.
Figure 11:
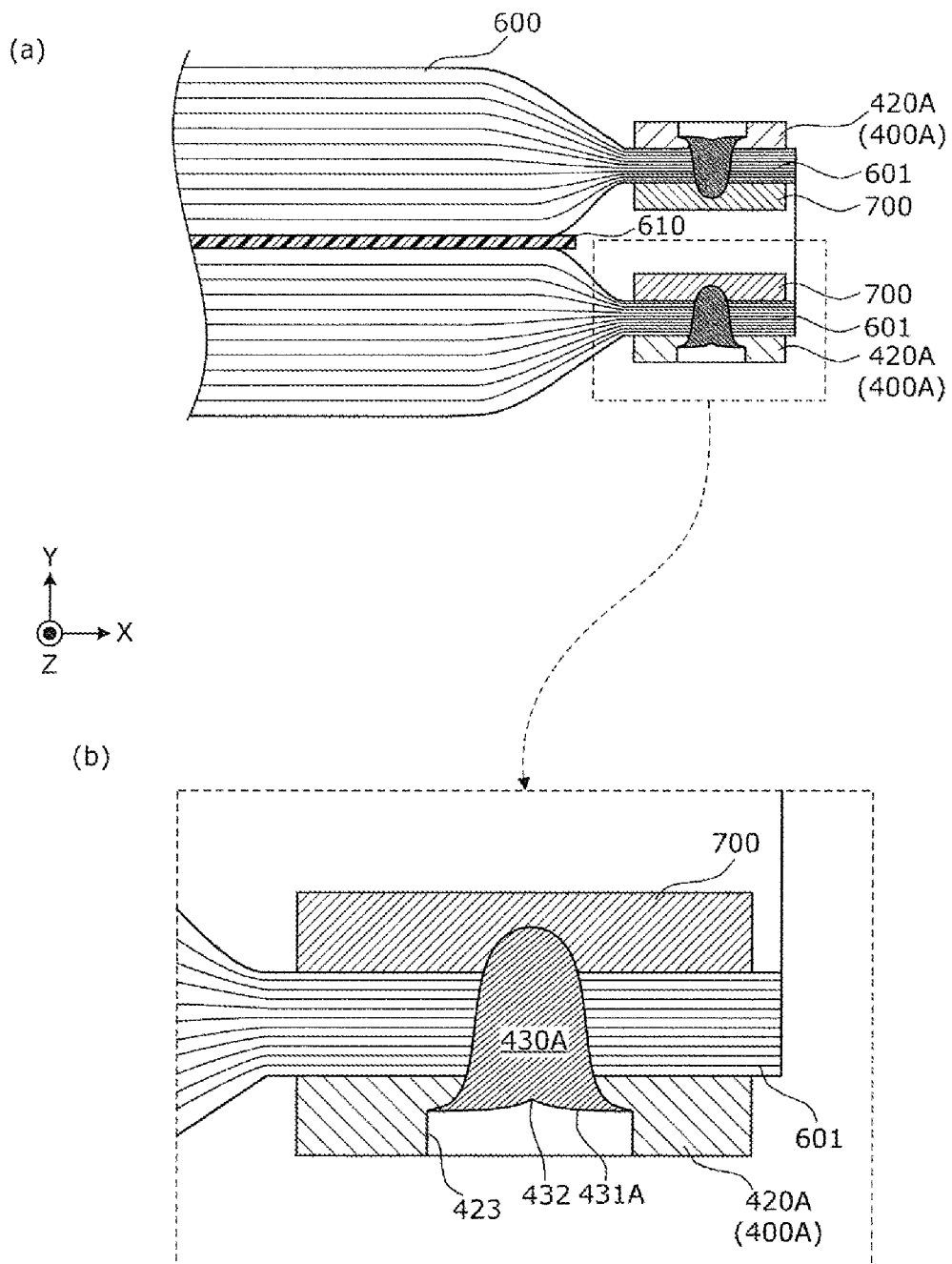
FIG. 11 is a cross-sectional view of a welded portion after the electrode assembly side arrangement portion and the converged portion shown in FIG. 10 are welded to each other.

FIG. 8 is a perspective view showing a configuration of the positive electrode current collector 400A according to the modification 1 of the embodiment of the present invention. (a) of FIG. 8 is a perspective view showing the overall configuration of the positive electrode current collector 400A, and (b) of FIG. 8 is an enlarged view of a portion of the positive electrode current collector 400A where the positive electrode current collector 400A is welded to an electrode assembly 600. FIG. 9 is a perspective view for describing a welded portion between the positive electrode current collector 400A and a converged portion 601 of the electrode assembly 600 according to the modification 1 of the embodiment of the present invention. FIG. 10 is a cross-sectional view of welded portions between electrode-assembly-side arrangement portions 420A and the converged portion 601 according to the modification 1 of the embodiment of the present invention taken along line X-X in FIG. 9. FIG. 11 is a cross-sectional view of the welded portions after the electrode-assembly-side arrangement portions 420A and the converged portion 601 in FIG. 10 are welded to each other. In the above-mentioned drawings, (a) of FIG. 10 is a cross-sectional view showing the overall configuration of the electrode-assembly-side arrangement portions 420A and the converged portion 601, and (b) of FIG. 10 is an enlarged view showing the welded portion between the electrode-assembly-side arrangement portion 420A and the converged portion 601 in an enlarged manner. (a) of FIG. 11 is a view showing the configuration in (a) of FIG. 10 after welding is performed, and (b) of FIG. 11 is a view showing the configuration in (b) of FIG. 10 after welding is performed.

As shown in FIG. 8 and FIG. 10, the positive electrode current collector 400A includes electrode-assembly-side arrangement portions 420A which respectively have a thin wall thickness portion 421A and a large wall thickness portion 422. Further, in the electrode-assembly-side arrangement portion 420A, the through hole 424A is formed in the thin wall thickness portion 421A. As shown in FIG. 9 and FIG. 10, laser welding is performed by irradiating a laser beam L to a portion of the thin wall thickness portion 421A around the through hole 424A so that the positive electrode current collector 400A is joined to the positive-electrode-side converged portion 601 of the electrode assembly 600 at the thin wall thickness portion 421A.

The electrode-assembly-side arrangement portion 420A of the positive electrode current collector 400A and the converged portion 601 of the electrode assembly 600 are joined to each other by laser welding as described above so that a welded portion 430A shown in FIG. 11 is formed. The welded portion 430A is formed in a state where the welded portion 430A reaches a cover member 700 through the electrode-assembly-side arrangement portion 420A and the converged portion 601 thus joining the electrode-assembly-side arrangement portion 420A, the converged portion 601, and the cover member 700 to each other.

Laser welding is performed at the thin wall thickness portion 421A of the electrode-assembly-side arrangement portion 420A and hence, the welded portion 430A is formed at the position corresponding to the thin wall thickness portion 421A of the electrode-assembly-side arrangement portion 420A. The thorough hole 424A is formed in the thin wall thickness portion 421A and hence, the through hole 424A is filled with metal melted by laser welding. With such a configuration, as shown in (b) of FIG. 11, a recess 432 is formed on a welding surface 431A. That is, the welded portion 430A has the recess 432 which is recessed toward a converged portion 601 side at the position in the vicinity of the center of the welding surface 431A.

As has been described above, according to the modification 1 of the embodiment of the present invention, the welded portion 430A has the recess 432 which is recessed from an outer peripheral portion of the welding surface 431A on the welding surface 431A and hence, a volume of the welded portion 430A can be made small. Accordingly, welding can be performed with small energy and hence, it is possible to suppress the occurrence of sputter and damage applied to the electrode assembly 600 at the time of welding.

(2) Modification 2

Next, a modification 2 of the embodiment of the present invention is described.

In the above-mentioned embodiment, the cover member 700 which is disposed inside the converged portion 601 of the electrode assembly 600 has a shape where the outer surface of the cover member 700 and the inner surface of the converged portion 601 are wholly brought into contact with each other. However, the cover member 700 is not limited to such a shape.

Figure 12:
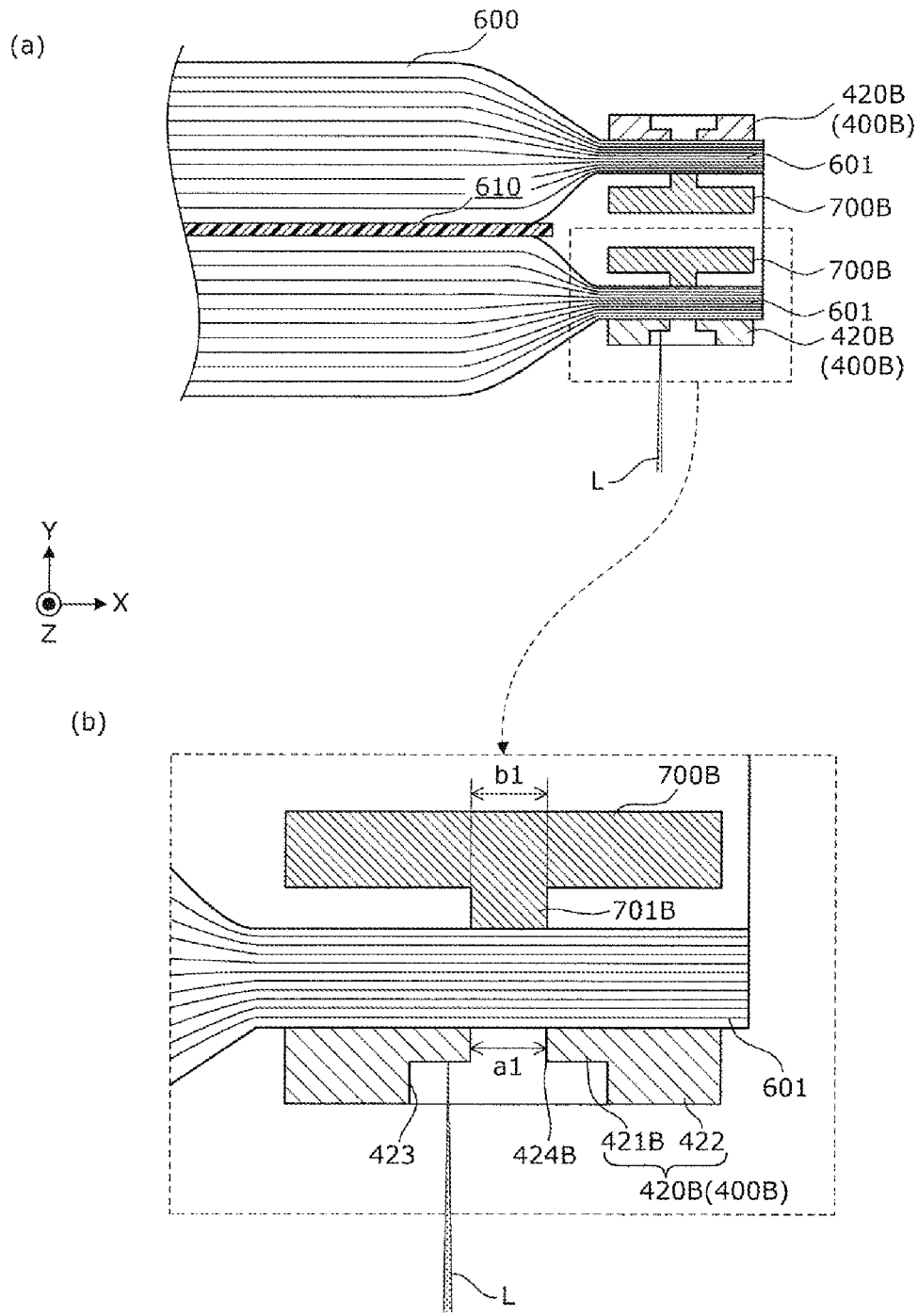
FIG. 12 is a cross-sectional view of the welded portion between the electrode assembly side arrangement portion and the converged portion according to the modification 1 of the embodiment of the present invention.

For example, as shown in FIG. 12, a cover member 700B having a projecting portion 701B which projects toward an electrode-assembly-side arrangement portion 420B may be adopted. In this case, the electrode-assembly-side arrangement portion 420B of a positive electrode current collector 400B is configured such that a through hole 424B is formed in a thin wall thickness portion 421B in the same manner as the electrode-assembly-side arrangement portion 420A of the modification 1. A width of the through hole 424B is set larger than a width of the through hole 424A in the X axis direction.

The projecting portion 701B is formed on the cover member 700B at the position corresponding to the through hole 424B formed in the electrode-assembly-side arrangement portion 420B. A width b1 of the projecting portion 701B in the X axis direction is set equal to or less than a width a1 of the through hole 424B formed in the thin wall thickness portion 421B in the X axis direction. With such a configuration, when the cover member 700B is disposed inside the converged portion 601 of the electrode assembly 600, a distal end of the projecting portion 701B of the cover member 700B is brought into contact with an inner surface of the converged portion 601, and outer surfaces of portions of the cover member 700B other than the projecting portion 701B are not brought into contact with the inner surface of the converged portion 601. That is, when the cover member 700B is disposed inside the converged portion 601, a space is formed between the cover member 700B and the converged portion 601.

Figure 13:
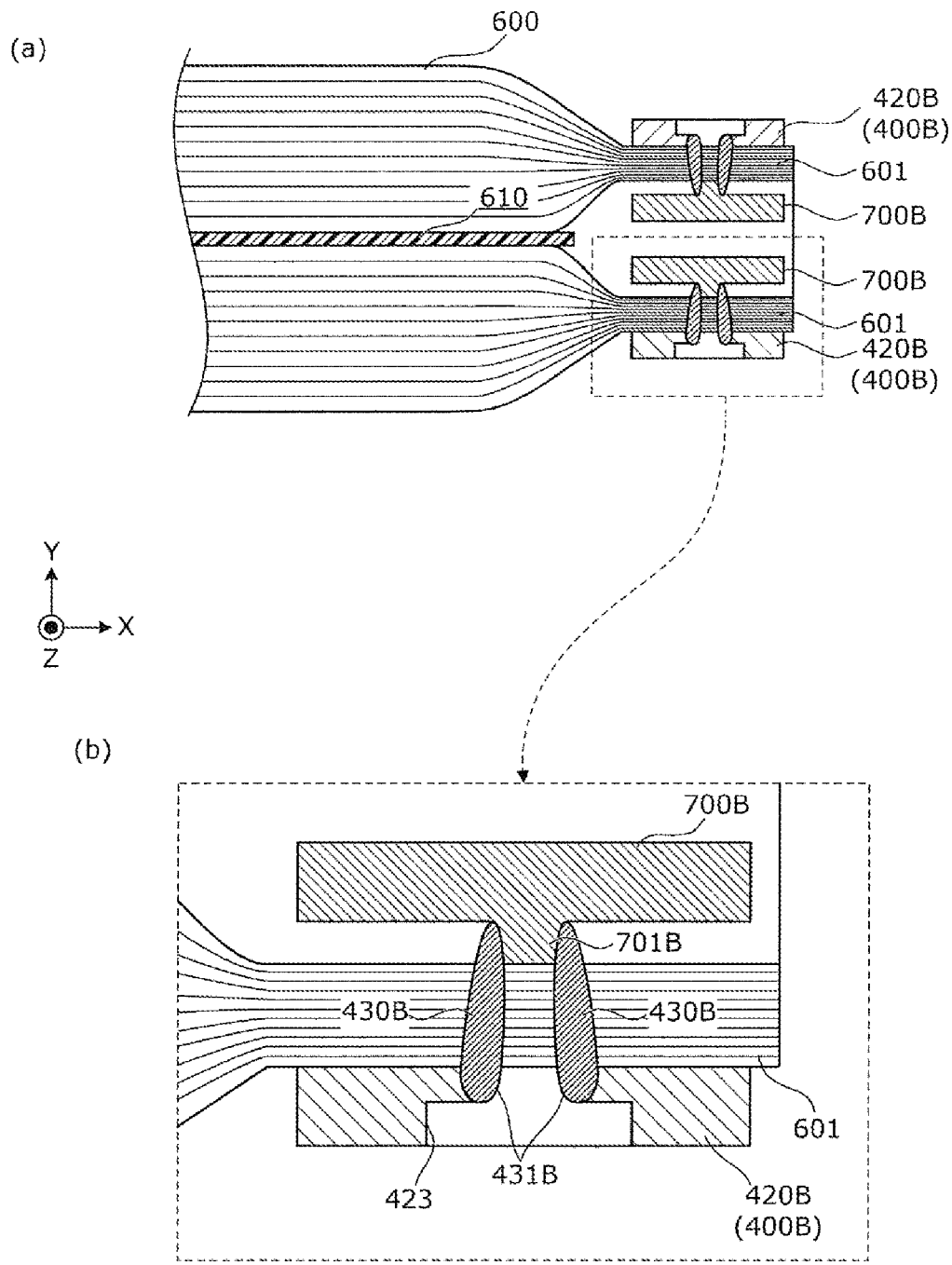
FIG. 13 is a cross-sectional view of the welded portion after the electrode assembly side arrangement portion and the converged portion shown in FIG. 12 are welded to each other.

As shown in FIG. 12, in the same manner as the modification 1, laser welding is performed by irradiating a laser beam L to a portion of the thin wall thickness portion 421B around the through hole 424B so that the positive electrode current collector 400B is joined to the converged portion 601 of the electrode assembly 600 and the projecting portion 701B of the cover member 700B at the thin wall thickness portion 421B. In this manner, by joining the electrode-assembly-side arrangement portion 420B of the positive electrode current collector 400B, the converged portion 601 of the electrode assembly 600, and the projecting portion 701B of the cover member 700B by laser welding, the welded portion 430B shown in FIG. 13 is formed. The welded portion 430B is formed in a state where the welded portion 430B reaches the projecting portion 701B through the electrode-assembly-side arrangement portion 420B and the converged portion 601 thus joining the electrode-assembly-side arrangement portion 420B, the converged portion 601, and the projecting portion 701B to each other.

The through hole 424B is formed in the thin wall thickness portion 421B, and the projecting portion 701B is formed on the cover member 700B at the position corresponding to the through hole 424B and hence, a welded portion 430B is formed over a portion around the through hole 424B, the converged portion 601, and the projecting portion 701B. The through hole 424B is larger than the through hole 424A in size and hence, the through hole 424B is not completely filled with metal melted by laser welding thus forming two welding surfaces 431B which are separated in the X axis direction. When the through hole is small, the through hole is filled with melted metal as described in the above-mentioned embodiment and hence, a recess is formed on the welding surface.

Also after welding is performed, a space is formed around the projecting portion 701B between the electrode assembly 600 and the cover member 700B. Accordingly, heat generated by welding can be radiated to the space at the time of welding. With such a configuration, it is possible to suppress damage applied to the electrode assembly 600 at the time of welding.

Figure 14:
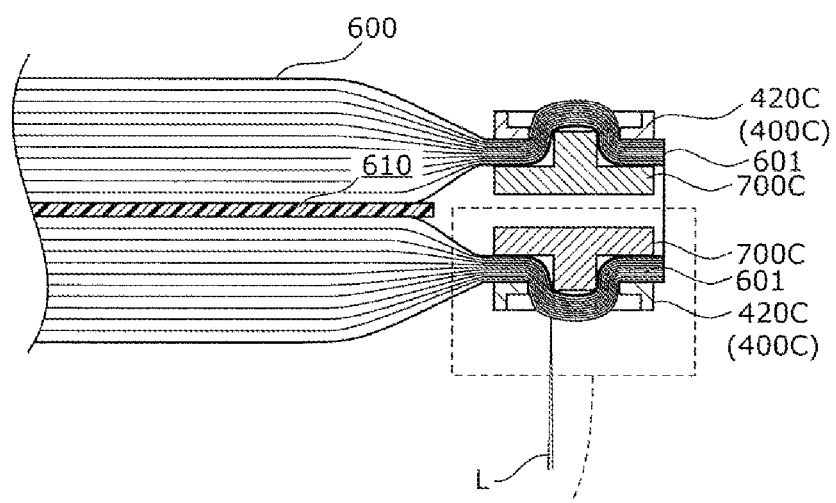
FIG. 14 is a cross-sectional view of the welded portion between the electrode assembly side arrangement portion and the converged portion according to the modification 1 of the embodiment of the present invention.
Figure 14:
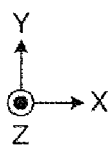
Figure 14:
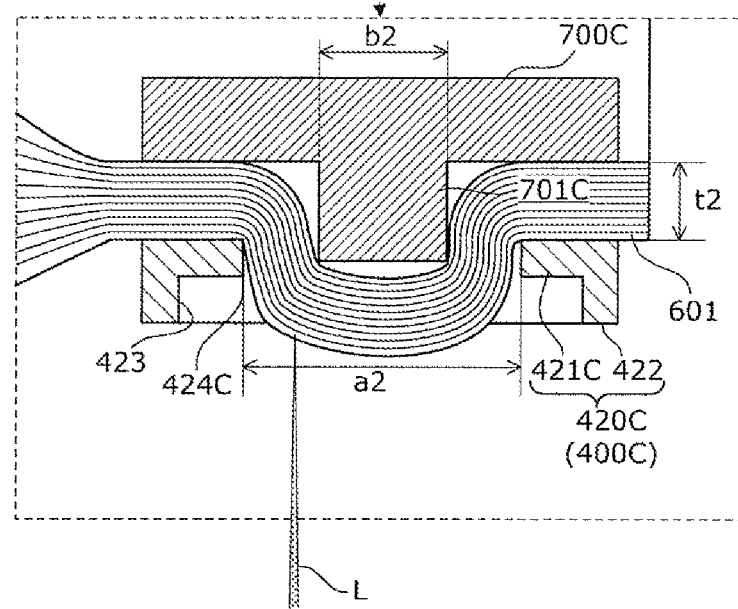

For example, as shown in FIG. 14, a cover member 700C having a projecting portion 701C which projects toward an electrode-assembly-side arrangement portion 420C may be adopted. In this case, the electrode-assembly-side arrangement portion 420C of a positive electrode current collector 400C is configured such that a through hole 424C is formed in a thin wall thickness portion 421C in the same manner as the modification 1 and the above-mentioned electrode-assembly-side arrangement portions 420A, 420B. A width of the through hole 424C is set larger than a width of the through hole 424A and a width of the through hole 424B in the X axis direction.

The projecting portion 701C is formed on the cover member 700C at the position corresponding to the through hole 424C formed in the electrode-assembly-side arrangement portion 420C. A width b2 of the projecting portion 701C in the X axis direction is equal to or more than the sum of a width a2 of the through hole 424C formed in the thin wall thickness portion 421C in the X axis direction and a length which is twice as large as a thickness t2 of the converged portion 601. Although not shown in the drawing, the same size setting is also applied to a width of the projecting portion 701C in the Y axis direction. That is, a width of the projecting portion 701C in the Y axis direction is equal to or more than the sum of a width of the through hole 424C formed in the thin wall thickness portion 421C in the Y axis direction and a length which is twice as large as the thickness t2 of the converged portion 601. That is, the projecting portion 701C has a shape where the projecting portion 701C can enter the through hole 424C formed in the thin wall thickness portion 421C together with the converged portion 601 when the projecting portion 701C is disposed at the predetermined positions of the converged portion 601 and the electrode-assembly-side arrangement portion 420C. Accordingly, when the cover member 700C is disposed inside the converged portion 601 of the electrode assembly 600, a distal end of the cover member 601C enters the through hole 424C formed in the thin wall thickness portion 421C of the electrode-assembly-side arrangement portion 420C together with the converged portion 601. With respect to the portion of the converged portion 601 which enters the through hole 424C, a part of the portion of the converged portion 601 is pushed out to the outside by the projecting portion 701C so that the portion of the converged portion 601 is formed into a shape which conforms with a shape of the projecting portion 701C. Accordingly, the converged portion 601 has a shape where the converged portion 601 is inclined from the periphery of the portion which enters the through hole 424C.

Figure 15:
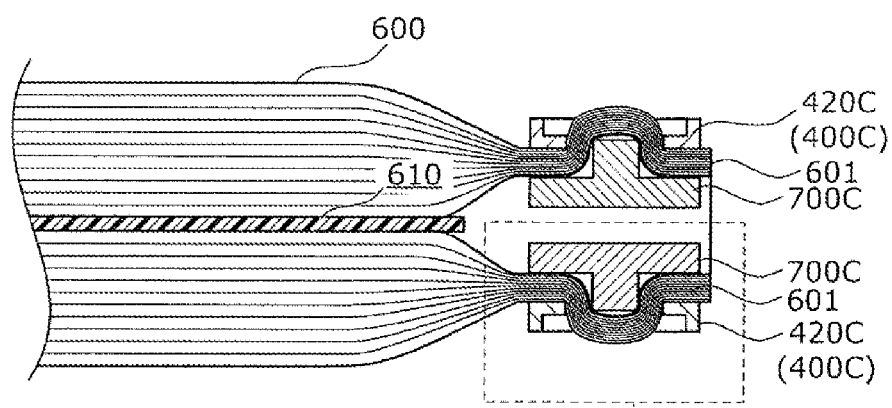
FIG. 15 is a cross-sectional view of the welded portion after the electrode assembly side arrangement portion and the converged portion shown in FIG. 14 are welded to each other.
Figure 15:
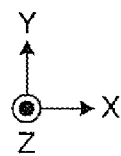
Figure 15:
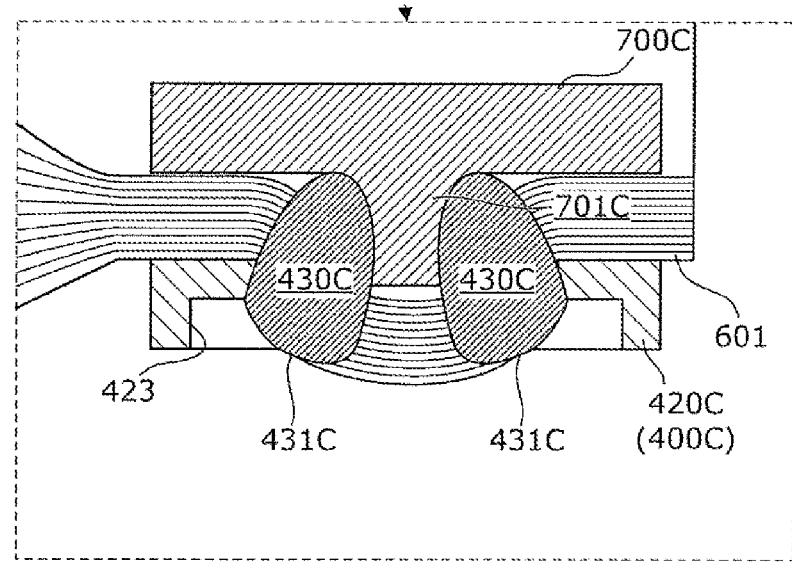

As shown in FIG. 14, laser welding is performed by irradiating a laser beam L to a portion of the thin wall thickness portion 421C in the positive electrode current collector 400C around the through hole 424C and the inclined portion of the converged portion 601 so that the thin wall thickness portion 421C, the converged portion 601 of the electrode assembly 600, and the projecting portion 701C of the cover member 700C are joined to each other. In this manner, by joining the electrode-assembly-side arrangement portion 420C, the converged portion 601, and the projecting portion 701C to each other by laser welding, welded portions 430C shown in FIG. 15 are formed. The welded portion 430C is formed in a state where the welded portion 430C reaches the projecting portion 701C through the electrode-assembly-side arrangement portion 420C and the converged portion 601 thus joining the electrode-assembly-side arrangement portion 420C, the converged portion 601, and the cover member 700C to each other.

Laser welding is performed at the thin wall thickness portion 421C of the electrode-assembly-side arrangement portion 420C and the inclined portion of the converged portion 601. Accordingly, the welded portion 430C is formed at the position corresponding to the thin wall thickness portion 421C of the electrode-assembly-side arrangement portion 420C and at the positions corresponding to the inclined portions of the converged portion 601. Further, laser welding is performed in a state where the projecting portion 701C and a portion of the converged portion 601 enter the through hole 424C and hence, the welded portion 430C is formed over the portion of the thin wall thickness portion 421C around the through hole 424C, the converged portion 601, and the projecting portion 701C. The projecting portion 701C is joined by laser welding in a state where the projecting portion 701C enters the through hole 424C and hence, the electrode-assembly-side arrangement portion 420C, the converged portion 601, and the cover member 700C are joined to each other in a state where a space is not so much formed between electrode-assembly-side arrangement portion 420C, the converged portion 601, and the cover member 700C.

As has been described above, the projecting portion of the cover member 700C enters the through hole 424C formed in the electrode-assembly-side arrangement portion 420C together with the converged portion 601 and hence, the periphery of the welded portion of the converged portion 601 can be inclined. That is, the periphery of the welded portion of the converged portion 601 is inclined and hence, even when sputter occurs at the time of welding, it is possible to suppress the occurred sputter from invading into the inside of the electrode assembly 600.

As has been described above, in the modification 2 shown in FIG. 12 to FIG. 15, the cover member 700B, 700C has the projecting portion 701B, 701C which projects toward the electrode-assembly-side arrangement portion 420B, 420C. Further, the projecting portion 701B, 701C is welded. With such a configuration, welding can be performed by locally concentrating energy to the cover member 700B, 700C and hence, welding can be performed with small energy whereby it is possible to suppress the occurrence of sputter and damage applied to the electrode assembly at the time of welding.

(3) Other Embodiments

Figure 16A:
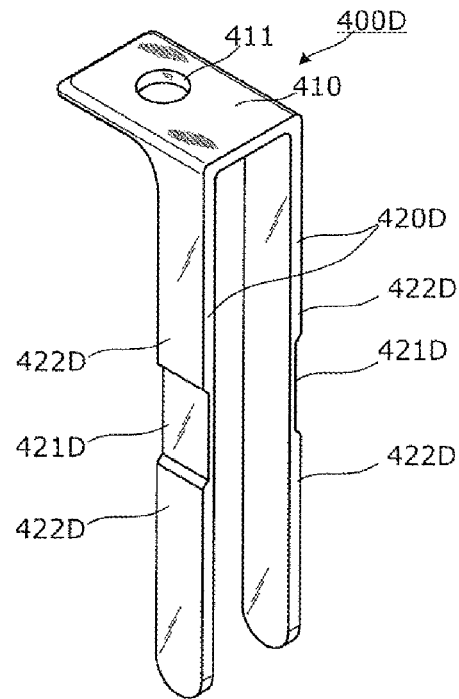
FIG. 16A is perspective view showing the configuration of a positive electrode current collector according to another embodiment of the present invention.
Figure 16B:
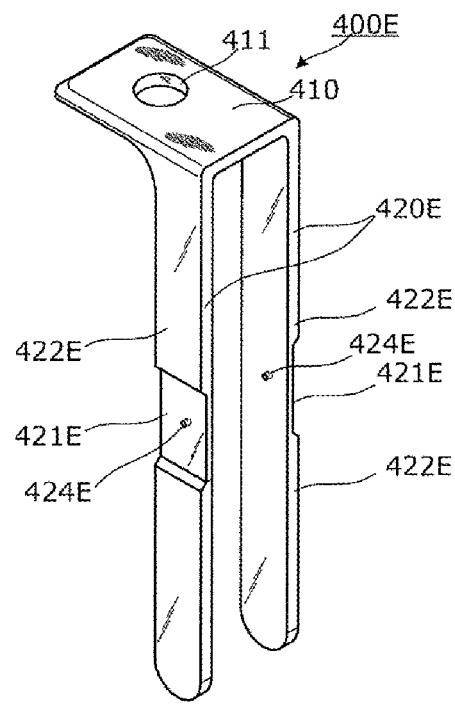
FIG. 16B is a perspective view showing the configuration of a positive electrode current collector according to still another embodiment of the present invention.

In the above-mentioned embodiment and the modifications of the embodiment, the large wall thickness portion 422 of the electrode-assembly-side arrangement portion 420, 420A to 420C of the positive electrode current collector 400, 400A to 400C is formed so as to surround the thin wall thickness portion 421, 421A to 421C. However, the present invention is not limited to such a configuration. For example, as shown in FIG. 16A and FIG. 16B, one modification may adopt a positive electrode assembly 400D, 400E which includes electrode-assembly-side arrangement portions 420D, 420E where large wall thickness portions 422D, 422E are formed so as to sandwich a thin wall thickness portion 421D, 421E therebetween. That is, it is sufficient that the positive electrode current collector has electrode-assembly-side arrangement portions where a thin wall thickness portion and a large wall thickness portion are disposed adjacently to each other. Further, as in the case of the positive electrode assembly 400E, it may be possible to adopt the positive electrode assembly 400E which has an electrode-assembly-side arrangement portion 420E in which a through hole 424E is formed.

In the above-mentioned embodiment and the modifications of the embodiment, the configuration is adopted where one thin wall thickness portion 421, 421A to 421E is formed on the electrode-assembly-side arrangement portion 420, 420A to 420E of the positive electrode current collector 400, 400A to 400E. However, a thin wall thickness portion may be formed on a plurality of portions of one electrode-assembly-side arrangement portion. In this case, the electrode-assembly-side arrangement portion can be welded to the electrode assembly 600 at plural portions of the converged portion 601 of the electrode assembly 600. By performing welding at the plural portions of the electrode-assembly-side arrangement portion, a plurality of welded portions is formed and hence, a sufficiently large electrically conductive area can be ensured between the positive electrode current collector and the electrode assembly 600.

In the above-mentioned embodiment and the modifications of the embodiment, the configuration is adopted where the electrode-assembly-side arrangement portions 420, 420A to 420E of the positive electrode current collector 400, 400A to 400E are disposed outside the converged portion 601 of the electrode assembly 600. However, the electrode-assembly-side arrangement portions 420, 420A to 420E of the positive electrode current collector 400, 400A to 400E may be disposed inside the converged portion 601 of the electrode assembly 600. In this case, the cover members 700, 700B, 700C are disposed outside the converged portion 601 of the electrode assembly 600. In this case, welding is performed from an electrode-assembly-side arrangement portion side which is disposed inside the converged portion 601. For example, welding from the inside of the converged portion 601 may be performed by electron beam welding where the welding is performed by bending an electron beam irradiated from an end portion side of the electrode assembly 600 toward the inside of the converged portion 601.

In the above-mentioned embodiment and the modifications of the embodiment, the configuration is adopted where the electrode-assembly-side arrangement portion 420, 420A to 420E has the thin wall thickness portion 421, 421A to 421E, and laser welding is performed from an electrode-assembly-side arrangement portion 420, 420A to 420E side. However, the present invention is not limited to such a configuration, and the configuration may be adopted where the cover member includes a thin wall thickness portion and laser welding is performed from a cover member side. In this case, the cover member forms a first conductive member. That is, the reverse configuration may be adopted where the relationship between the configuration of the electrode-assembly-side arrangement portion and the configuration of the cover member described above is reversed. To be more specific, in FIG. 6, FIG. 7, and FIG. 10 to FIG. 15, "reverse configuration" means that symbols 420, 420A to 420C which are used for indicating the configuration of the electrode-assembly-side arrangement portion are used for indicating the configuration of the cover member, and symbols 700, 700B, 700C which are used for indicating the configuration of the cover member are used for indicating the configuration of the electrode-assembly-side arrangement portion. In this case, although the overall configuration of the current collector is not shown in the drawings, the electrode-assembly-side arrangement portions of the current collector are disposed inside the converged portion 601 of the electrode assembly 600.

In the above-mentioned embodiment and the modifications of the embodiment, either one of the configuration where laser welding is performed from the electrode-assembly-side arrangement portion side or the configuration where laser welding is performed from the cover member side is adopted. However, the configuration may be adopted where laser welding is performed from both the electrode-assembly-side arrangement portion side and the cover member side. Also in this case, laser welding is performed at the thin wall thickness portion formed on the electrode-assembly-side arrangement portion and the thin wall thickness portion formed on the cover member. The thin wall thickness portion formed on the electrode-assembly-side arrangement portion and the thin wall thickness portion formed on the cover member may be disposed at positions which are disposed opposite to each other, and may be disposed at positions which differ from each other.

In the above-mentioned embodiment, the electrode assembly 600 is configured such that the converged portion 601 is split into two split portions in the stacking direction, and the electrode-assembly-side arrangement portion and the cover member are disposed on each of two split portions. However, the converged portion 601 may not be split into two split portions. That is, even in the winding-type electrode assembly 600, the configuration may be adopted where an electrode-assembly-side arrangement portion is disposed on one surface of a converged portion in a state where the converged portion is converged to one portion, and a cover member is disposed on the other surface of the converged portion.

In the above-mentioned embodiment, the winding-type electrode assembly is adopted as the electrode assembly 600. However, a stacking-type electrode assembly where positive electrodes, negative electrodes and separators are stacked to each other without being wound may be adopted as the electrode assembly 600. In this case, a converged portion may not be split into two split portions in the stacking direction, and may be configured such that the converged portion is formed of one portion, an electrode-assembly-side arrangement portion is disposed on one surface of the one portion, and a cover member is disposed on the other surface of the one portion. However, also when the stacking-type electrode assembly is adopted, the configuration may be adopted where a converged portion is split into two split portions in the stacking direction.

In the above-mentioned embodiment, in the converged portion 601 of the electrode assembly 600, the cover member 700 is disposed on a side opposite to the electrode-assembly-side arrangement portion 420. However, the configuration may be adopted where the cover member 700 is not disposed on the converged portion 601.

With respect to the above-mentioned configurations, the same configurations are also applicable to the negative electrode current collector, the negative-electrode-side converged portion 602, and the cover member 800 in the same manner.

Further, the configurations which are obtained by arbitrarily combining the constitutional elements of the above-mentioned embodiment and the constitutional elements of the modifications of the embodiment also fall within the scope of the present invention.

INDUSTRIAL APPLICABILITY

The present invention is applicable to an energy storage device which can suppress lowering of performance of the energy storage device and the like.

DESCRIPTION OF REFERENCE SIGNS

10: energy storage device
100: container
110: lid body
111, 112, 411, 511: through hole
120: container body
200: positive electrode terminal
210, 310: projecting portion
300: negative electrode terminal
400, 400A to 400E: positive electrode current collector
410: terminal-side arrangement portion
420, 420A to 420E: electrode-assembly-side arrangement portion
421, 421A to 421E: thin wall thickness portion
422, 422D, 422E: large wall thickness portion
423: wall
424A to 424C, 424E: through hole
430, 430A to 430C: welded portion
431, 431A to 431C: welding surface
500: negative electrode current collector
600: electrode assembly
601, 602: converged portion
610: winding core
700, 700B, 700C: cover member
701B, 701C: projecting portion
800: cover member

The invention claimed is:

1. An energy storage device, comprising:
an electrode assembly formed by stacking plates;
a first conductive member including a thinned wall thickness portion and welded, at the thinned wall thickness portion, to one of both surfaces of a converged portion on an end portion in a first direction of the electrode assembly without covering the converged portion from an end portion side; and
a second conductive member disposed on a side opposite to the first conductive member with the converged portion sandwiched between the first conductive member and the second conductive member,
wherein a welding surface of a welded portion, where the electrode assembly and the first conductive member are welded to each other, is disposed at a position recessed from an outer surface of the first conductive member,
wherein the converged portion extends in a second direction intersecting with the first direction, and
wherein the thinned wall thickness portion extends in the second direction such that a longitudinal direction of an extension of the thinned wall thickness portion is in the second direction.

2. The energy storage device according to claim 1, wherein the first conductive member includes a current collector which the energy storage device includes or a cover member which the energy storage device includes and is disposed on a side opposite to the current collector with the electrode assembly sandwiched between the cover member and the current collector.

3. The energy storage device according to claim 1, wherein the welded portion includes a recess on the welding surface.

4. The energy storage device according to claim 1, wherein the first conductive member includes a wall which surrounds an outer periphery of the welding surface.

5. The energy storage device according to claim 1, the second conductive member including a projecting portion projecting toward the first conductive member,
wherein the projecting portion is welded at the welded portion.

6. The energy storage device according to claim 5, wherein a space is formed around the projecting portion between the electrode assembly and the second conductive member.

7. The energy storage device according to claim 5, wherein the first conductive member includes a through hole which penetrates the first conductive member in a thickness direction, and
wherein the projecting portion is inserted in the through hole together with the converged portion.

8. The energy storage device according to claim 1, wherein the first conductive member is disposed outside the electrode assembly.

9. The energy storage device according to claim 1, wherein a longitudinal direction of an extension of the converged portion is in the second direction.

10. An energy storage device, comprising:
an electrode assembly;
a conductive member welded to the electrode assembly, wherein a welding surface of a welded portion, where the electrode assembly and the conductive member are welded to each other, is disposed at a position recessed from an outer surface of the conductive member,
wherein the welded portion includes, on the welding surface, a recessed portion recessed from an outer peripheral portion of the welding surface,
wherein the conductive member includes a thinned wall thickness portion of the electrode assembly, the conductive member being welded, at the thinned wall thickness portion, to a surface of a converged portion, and
wherein a longitudinal direction of an extension of the converged portion is the same as a longitudinal direction of an extension of the thinned wall thickness portion; and another conductive member disposed on a side opposite to the conductive member with the converged portion sandwiched between the conductive member and said another conductive member.

11. The energy storage device according to claim 10, wherein the recessed portion is recessed from the outer peripheral portion of the welding surface toward a side of the converged portion of the electrode assembly in a vicinity of a center of the welding surface.

12. An energy storage device, comprising:
an electrode assembly formed by stacking plates; and
a conductive member welded to one of both surfaces of a converged portion on an end portion of the electrode assembly without covering the converged portion from an end portion side,
wherein the conductive member includes:
a thinned wall thickness portion in which a through hole is formed at a welding scheduled position; and
a wall which surrounds a periphery of the thinned wall thickness portion.

13. A method of manufacturing an energy storage device, the method comprising:
disposing a conductive member on one of both surfaces of a converged portion on an end portion in a first direction of an electrode assembly formed by stacking plates without covering the converged portion from an end portion side;
welding the conductive member, disposed in the disposing to the one surface of the converged portion, on a thinned wall thickness portion of the conductive member; and
disposing another conductive member on a side opposite to the conductive member with the converged portion sandwiched between the conductive member and said another conductive member,
wherein the converged portion extends in a second direction intersecting with the first direction, and
wherein the thinned wall thickness portion extends in the second direction such that a longitudinal direction of an extension of the thinned wall thickness portion is in the second direction.

14. The method of manufacturing an energy storage device according to claim 13, wherein the conductive member includes:
the thinned wall thickness portion in which a through hole is formed; and
a wall which is formed around the thinned wall thickness portion, and
wherein the welding is performed on the thinned wall thickness portion around the through hole in the welding.

15. The method of manufacturing an energy storage device according to claim 13, wherein a longitudinal direction of an extension of the converged portion is in the second direction.

16. A current collector provided to an energy storage device, the current collector comprising:
a flat-plate-like portion welded to one of both surfaces of a converged portion on an end portion of the electrode assembly provided to the energy storage device without covering the converged portion from an end portion side,
wherein the flat-plate-like portion includes a thinned wall thickness portion in which a through hole is formed at a welding scheduled position.

17. A cover member provided to an energy storage device, the cover member comprising:
a flat-plate-like portion welded to one of both surfaces of a converged portion on an end portion of an electrode assembly provided to the energy storage device without covering the converged portion from an end portion side,
wherein the flat-plate-like portion includes a thinned wall thickness portion in which a through hole is formed at a welding scheduled position.

* * * * *